United States Patent
Kawada et al.

(10) Patent No.: US 11,724,481 B2
(45) Date of Patent: Aug. 15, 2023

(54) INTERLAYER FILM FOR LAMINATED GLASS, AND LAMINATED GLASS

(71) Applicant: SEKISUI CHEMICAL CO., LTD., Osaka (JP)

(72) Inventors: Shinji Kawada, Osaka (JP); Yuki Ishikawa, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 17/620,888

(22) PCT Filed: Nov. 20, 2019

(86) PCT No.: PCT/JP2019/045501
§ 371 (c)(1),
(2) Date: Dec. 20, 2021

(87) PCT Pub. No.: WO2021/002033
PCT Pub. Date: Jan. 7, 2021

(65) Prior Publication Data
US 2022/0363039 A1 Nov. 17, 2022

(30) Foreign Application Priority Data
Jul. 2, 2019 (JP) .................................. 2019-123788

(51) Int. Cl.
*B32B 17/10* (2006.01)
*B32B 27/08* (2006.01)
(Continued)

(52) U.S. Cl.
CPC .. *B32B 17/10743* (2013.01); *B32B 17/10036* (2013.01); *B32B 17/10605* (2013.01);
(Continued)

(58) Field of Classification Search
CPC .......... B32B 17/10761; B32B 17/10743; C09J 133/00–133/12
See application file for complete search history.

(56) References Cited

U.S. PATENT DOCUMENTS 4,358,329 A * 11/1982 Masuda ............ B32B 17/10688
156/99
2017/0028687 A1* 2/2017 DeRosa .............. C08F 220/282

FOREIGN PATENT DOCUMENTS

EP 3 747 846 12/2020
JP 6-99547 4/1994
(Continued)

OTHER PUBLICATIONS

Machine translation of JP2003-040653. Retrieved Dec. 13, 2022.*
(Continued)

*Primary Examiner* — Prashant J Khatri
(74) *Attorney, Agent, or Firm* — Wenderoth, Lind & Ponack, L.L.P.

(57) ABSTRACT

Provided is an interlayer film for laminated glass capable of enhancing the pour stability at the time of extrusion during production of the interlayer film for laminated glass, and having excellent shape stability. An interlayer film for laminated glass according to the present invention is an interlayer film for laminated glass having a one-layer or two or more-layer structure, and includes a first layer containing a thermoplastic (meth)acrylic polymer and satisfies at least one of a first configuration that the thermoplastic (meth)acrylic polymer contained in the first layer is a thermoplastic (meth)acrylic polymer having a molecular weight distribution ratio of weight average molecular weight to number average molecular weight of 1 or more and 6 or less, and a second configuration that the thermoplastic (meth)acrylic polymer contained in the first layer is a thermoplastic
(Continued)

(meth)acrylic polymer having a gel fraction of 5% by weight or less.

26 Claims, 2 Drawing Sheets

(51) Int. Cl.
  *B32B 27/22* (2006.01)
  *B32B 27/30* (2006.01)

(52) U.S. Cl.
  CPC .. *B32B 17/10678* (2013.01); *B32B 17/10706* (2013.01); *B32B 17/10761* (2013.01); *B32B 27/08* (2013.01); *B32B 27/22* (2013.01); *B32B 27/306* (2013.01); *B32B 27/308* (2013.01); *B32B 2307/732* (2013.01); *B32B 2419/00* (2013.01); *B32B 2605/006* (2013.01)

(56) References Cited

FOREIGN PATENT DOCUMENTS

| JP | 6-157081 | 6/1994 |
|---|---|---|
| JP | 2003-40653 | 2/2003 |
| JP | 2003040653 A * | 2/2003 |
| JP | 2004-250254 | 9/2004 |
| JP | 2008-37018 | 2/2008 |
| JP | 2013-39833 | 2/2013 |
| JP | 2015-67804 | 4/2015 |
| JP | 2019-119635 | 7/2019 |
| JP | 2019-147704 | 9/2019 |
| TW | 201829184 | 8/2018 |
| TW | 201841752 | 12/2018 |
| WO | 2017/209013 | 12/2017 |
| WO | 2018/181746 | 10/2018 |
| WO | 2018/181757 | 10/2018 |
| WO | 2019/151326 | 8/2019 |

OTHER PUBLICATIONS

International SearchReport (ISR) dated Feb. 10, 2020 in International (PCT) Application No. PCT/JP2019/045501.
International Preliminary Report on Patentability and Written Opinion of the International Searching Authority dated Dec. 28, 2021 in International (PCT) Application No. PCT/JP2019/045501.
1-Hydroxycyclohexyl phenyl ketone, CAS No. 947-19-3, 2016, pp. 1-5, with English translation.
English Search Report dated Jun. 26, 2023 in corresponding European Application No. 19936245.0.

* cited by examiner

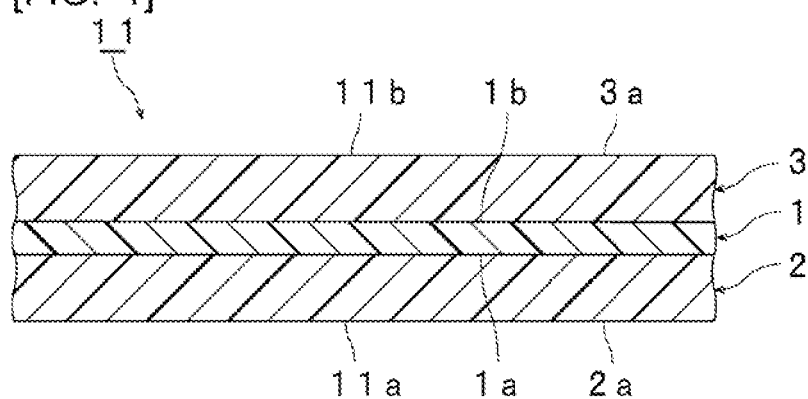
[FIG. 1]
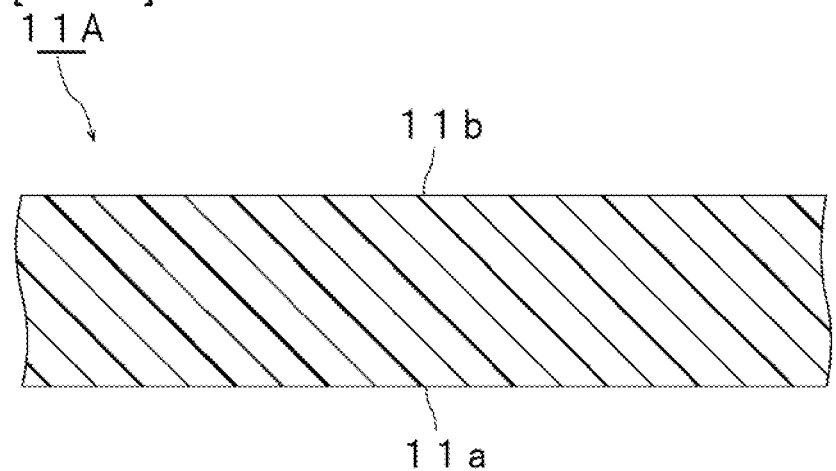
[FIG. 2]
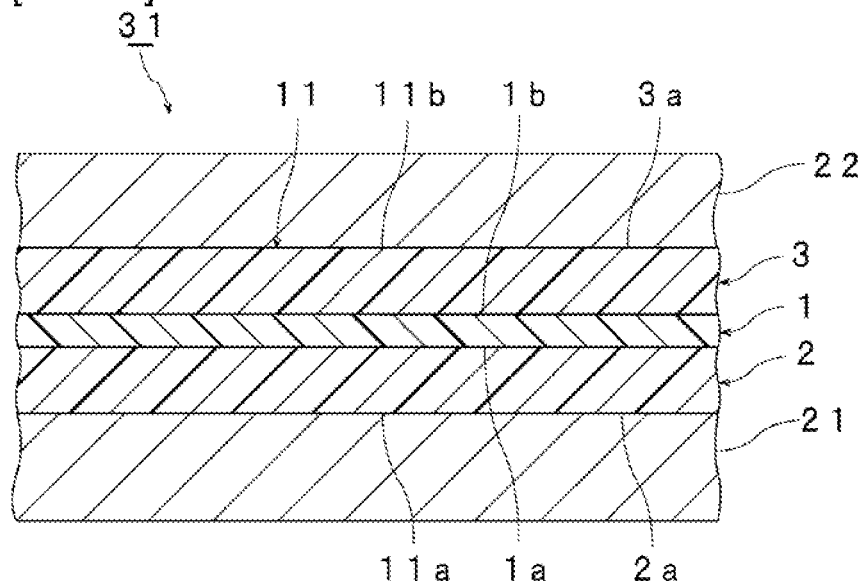
[FIG. 3]

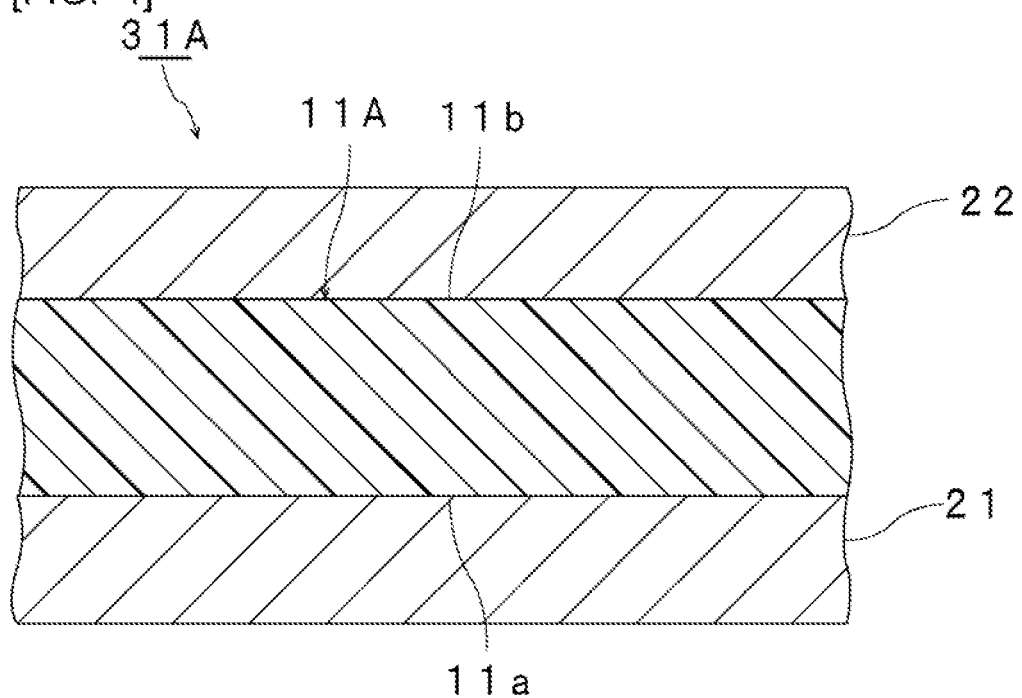
[FIG. 4]

INTERLAYER FILM FOR LAMINATED GLASS, AND LAMINATED GLASS

TECHNICAL FIELD

The present invention relates to an interlayer film for laminated glass which is used for obtaining laminated glass. Moreover, the present invention relates to a laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between two glass plates.

The following Patent Document 1 discloses a photocurable resin composition for interlayer film of laminated glass containing a (meth)acrylic polymer, a (meth)acrylic monomer, and a photopolymerization initiator.

RELATED ART DOCUMENT

Patent Document

Patent Document 1: WO2017/209013A1

SUMMARY OF THE INVENTION

Problems to be Solved by the Invention

As described in Patent Document 1, an interlayer film for laminated glass using a (meth)acrylic polymer is known. In Patent Document 1, an interlayer film for laminated glass is produced using the photocurable resin composition by a method other than extrusion molding.

Meanwhile, from the viewpoint of enhancing the production efficiency, it is preferred to produce an interlayer film for laminated glass by extrusion molding. When an interlayer film for laminated glass is produced by using a material containing a (meth)acrylic polymer, however, the material may not be extrudable from the mold, or the melting viscosity of the material may be excessively high at the time of extruding the material from the mold to cause deterioration in pour stability. If the pour stability of the material is low, variation can arise in the shape of the obtained interlayer film for laminated glass.

It is an object of the present invention to provide an interlayer film for laminated glass capable of enhancing the pour stability at the time of extrusion during production of the interlayer film for laminated glass, and having excellent shape stability.

Means for Solving the Problems

According to a broad aspect of the present invention, there is provided an interlayer film for laminated glass (in the present specification, "interlayer film for laminated glass" is sometimes abbreviated as "interlayer film") having a one-layer or two or more-layer structure, the interlayer film for laminated glass including a first layer containing a thermoplastic (meth)acrylic polymer, the interlayer film for laminated glass satisfying at least one of a first configuration that the thermoplastic (meth)acrylic polymer contained in the first layer is a thermoplastic (meth)acrylic polymer having a molecular weight distribution ratio of weight average molecular weight to number average molecular weight of 1 or more and 6 or less, and a second configuration that the thermoplastic (meth)acrylic polymer contained in the first layer is a thermoplastic (meth)acrylic polymer having a gel fraction of 5% by weight or less.

In a specific aspect of the interlayer film according to the present invention, the thermoplastic (meth)acrylic polymer contained in the first layer is a thermoplastic (meth)acrylic polymer having a molecular weight distribution ratio of weight average molecular weight to number average molecular weight of 1 or more and 6 or less.

In a specific aspect of the interlayer film according to the present invention, the thermoplastic (meth)acrylic polymer contained in the first layer is a thermoplastic (meth)acrylic polymer having a gel fraction of 5% by weight or less.

In a specific aspect of the interlayer film according to the present invention, the thermoplastic (meth)acrylic polymer contained in the first layer is a thermoplastic (meth)acrylic polymer having a molecular weight distribution ratio of weight average molecular weight to number average molecular weight of 1 or more and 6 or less, and a gel fraction of 10% by weight or less.

In a specific aspect of the interlayer film according to the present invention, the thermoplastic (meth)acrylic polymer contained in the first layer is a thermoplastic (meth)acrylic polymer having a molecular weight distribution ratio of weight average molecular weight to number average molecular weight of 10 or less, and a gel fraction of 5% by weight or less.

In a specific aspect of the interlayer film according to the present invention, the thermoplastic (meth)acrylic polymer contained in the first layer is a thermoplastic (meth)acrylic polymer having a weight average molecular weight of 500000 or more and 1900000 or less.

In a specific aspect of the interlayer film according to the present invention, the thermoplastic (meth)acrylic polymer contained in the first layer is a thermoplastic (meth)acrylic polymer having a weight average molecular weight of 700000 or more and 1400000 or less.

In a specific aspect of the interlayer film according to the present invention, the thermoplastic (meth)acrylic polymer contained in the first layer is a polymer contained in a cured product obtained by curing a polymerizable composition containing a (meth)acrylic monomer and a photopolymerization initiator by irradiation with an active energy ray.

In a specific aspect of the interlayer film according to the present invention, a content of the (meth)acrylic monomer in 100% by weight of the first layer is 3% by weight or less.

In a specific aspect of the interlayer film according to the present invention, when the polymerizable composition is cured by irradiation with an active energy ray to obtain a cured product layer having a thickness of 0.8 mm, and the cured product layer is measured for dynamic viscoelasticity under conditions of a frequency of 1 Hz and a shearing mode, a peak temperature of tan δ is −10° C. or more and 100° C. or less.

In a specific aspect of the interlayer film according to the present invention, the polymerizable composition contains an ultraviolet absorber.

In a specific aspect of the interlayer film according to the present invention, when a maximum absorption wavelength in wavelengths of 300 nm or more of the photopolymerization initiator is defined as $\lambda_1$ nm, a maximum absorbance in wavelengths of 280 nm or more of the ultraviolet absorber is defined as A, and a wavelength that satisfies A/4 and is larger than $\lambda_1$ is defined as $\lambda_2$ nm, a combination of the photopolymerization initiator and the ultraviolet absorber is such a combination that difference between $\lambda_2$ and $\lambda_1$ is 40 nm or less.

In a specific aspect of the interlayer film according to the present invention, the polymerizable composition contains a light absorber other than an ultraviolet absorber, and when a maximum absorption wavelength in wavelengths of 300 nm or more of the photopolymerization initiator is defined as $\lambda_1$ nm, a maximum absorbance in wavelengths of 280 nm or more of the light absorber other than an ultraviolet absorber is defined as B, and a wavelength that satisfies B/4 and is larger than $\lambda_1$ is defined as $\lambda_1$ nm, a combination of the photopolymerization initiator and the light absorber other than an ultraviolet absorber is such a combination that difference between $\lambda_3$ and $\lambda_1$ is 60 nm or less.

In a specific aspect of the interlayer film according to the present invention, when a maximum absorption wavelength in wavelengths of 300 nm or more of the photopolymerization initiator is defined as $\lambda_1$ nm, a maximum wavelength of the active energy ray is ($\lambda_1$+20) nm or more and ($\lambda_1$+50) nm or less.

In a specific aspect of the interlayer film according to the present invention, the (meth)acrylic monomer contains a multifunctional (meth)acrylic monomer, and a content of the multifunctional (meth)acrylic monomer in 100% by weight of the first layer is less than 0.05% by weight.

In a specific aspect of the interlayer film according to the present invention, when a polymerizable composition layer obtained by applying the polymerizable composition in a thickness of 3 mm is cured by irradiation with an active energy ray of 350 mJ/cm², a maximum temperature of a surface of the polymerizable composition layer at the time of curing is 125° C. or less.

In a specific aspect of the interlayer film according to the present invention, the polymerizable composition contains a polymerization inhibitor.

In a specific aspect of the interlayer film according to the present invention, the first layer contains a plasticizer.

In a specific aspect of the interlayer film according to the present invention, the first layer contains a tackifier.

In a specific aspect of the interlayer film according to the present invention, the interlayer film has a two or more-layer structure, and includes a second layer layered on a first surface of the first layer.

In a specific aspect of the interlayer film according to the present invention, the second layer contains a thermoplastic resin.

In a specific aspect of the interlayer film according to the present invention, the thermoplastic resin contained in the second layer is a polyvinyl acetal resin.

In a specific aspect of the interlayer film according to the present invention, the interlayer film has a three or more-layer structure, and includes a third layer layered on a second surface opposite to the first surface of the first layer.

In a specific aspect of the interlayer film according to the present invention, the third layer contains a thermoplastic resin.

In a specific aspect of the interlayer film according to the present invention, the thermoplastic resin contained in the third layer is a polyvinyl acetal resin.

According to a broad aspect of the present invention, there is provided a laminated glass including a first lamination glass member, a second lamination glass member, and the above-described interlayer film for laminated glass, the interlayer film for laminated glass being arranged between the first lamination glass member and the second lamination glass member.

Effect of the Invention

The interlayer film for laminated glass according to the present invention has a one-layer structure or a two or more-layer structure. The interlayer film for laminated glass according to the present invention includes a first layer containing a thermoplastic (meth)acrylic polymer. The interlayer film for laminated glass according to the present invention satisfies at least one of the following first configuration and the following second configuration. First configuration: the thermoplastic (meth)acrylic polymer contained in the first layer is a thermoplastic (meth)acrylic polymer having a molecular weight distribution ratio of weight average molecular weight to number average molecular weight of 1 or more and 6 or less. Second configuration: the thermoplastic (meth)acrylic polymer contained in the first layer is a thermoplastic (meth)acrylic polymer having a gel fraction of 5% by weight or less. Since the interlayer film for laminated glass according to the present invention is provided with the above configuration, it is possible to enhance the pour stability at the time of extrusion during production of the interlayer film for laminated glass, and the interlayer film for laminated glass is excellent in shape stability.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

MODE(S) FOR CARRYING OUT THE INVENTION

The interlayer film for laminated glass according to the present invention (hereinafter, sometimes abbreviated as "interlayer film") has a one-layer structure or a two or more-layer structure.

The interlayer film for laminated glass according to the present invention includes a first layer containing a thermoplastic (meth)acrylic polymer.

The interlayer film for laminated glass according to the present invention satisfies at least one of the following first configuration and the following second configuration.

First configuration (hereinafter, also referred to as configuration (1)): the thermoplastic (meth)acrylic polymer contained in the first layer is a thermoplastic (meth)acrylic polymer having a molecular weight distribution ratio of weight average molecular weight to number average molecular weight (weight average molecular weight/number average molecular weight) of 1 or more and 6 or less.

Second configuration (hereinafter, also referred to as configuration (2)): the thermoplastic (meth)acrylic polymer contained in the first layer is a thermoplastic (meth)acrylic polymer having a gel fraction of 5% by weight or less.

The interlayer film for laminated glass according to the present invention may be provided with only the configuration (1), or may be provided with only the configuration (2), or may be provided with both the configuration (1) and the configuration (2). When the interlayer film for laminated glass according to the present invention is provided with the configuration (1), the gel fraction of the (meth)acrylic polymer may exceed 5% by weight. When the interlayer film for laminated glass according to the present invention is provided with the configuration (2), the molecular weight distribution ratio (weight average molecular weight/number average molecular weight) of the thermoplastic (meth)acrylic polymer may be less than 1 or may be more than 6.

In general, a (meth)acrylic polymer obtained by free radical polymerization or bulk polymerization may have an excessively large molecular weight distribution ratio (weight average molecular weight/number average molecular weight) or may have an excessively large gel fraction. Since a (meth)acrylic polymer having an excessively large molecular weight distribution ratio is in such a state that a low molecular weight component and a high molecular weight component coexist in a wide range, use of a material containing such a (meth)acrylic polymer as a material for an interlayer film may result in large difference in melting viscosity due to excessive increase in melting viscosity and excessive decrease in melting viscosity, and is likely to cause deterioration in the pour stability at the time of extrusion. Also, a (meth)acrylic polymer having an excessively large gel fraction can not be kneaded by heating because it lacks thermoplasticity.

In contrast, in the interlayer film for laminated glass according to the present invention, since the above configuration is provided, the pour stability at the time of extrusion can be enhanced during production of the interlayer film for laminated glass. Therefore, the interlayer film for laminated glass according to the present invention is excellent in shape stability. In the present invention, it is possible to enhance the production efficiency of the interlayer film for laminated glass, and it is possible to suppress the variation in the shape of the interlayer film for laminated glass.

Also, in the interlayer film for laminated glass according to the present invention, since the above configuration is provided, it is possible to effectively prevent occurrence of foaming in the laminated glass prepared with the interlayer film.

Also, in the present invention, it is possible to keep the reaction temperature at the time of curing of the polymerizable composition low, and it is possible to prevent generation of creases in the obtained cured product.

The present invention also provides the following material for molding an interlayer film for laminated glass.

The material for molding an interlayer film for laminated glass is a material for molding an interlayer film for laminated glass to be used for obtaining an interlayer film for laminated glass by extrusion molding, and contains a thermoplastic (meth)acrylic polymer. The material for molding an interlayer film for laminated glass includes the following configuration (1') or the following configuration (2').

Configuration (1') (1-2 configuration): the thermoplastic (meth)acrylic polymer is a thermoplastic (meth)acrylic polymer having a molecular weight distribution ratio of weight average molecular weight to number average molecular weight of 1 or more and 6 or less.

Configuration (2') (2-2 configuration): the thermoplastic (meth)acrylic polymer is a thermoplastic (meth)acrylic polymer having a gel fraction of 5% by weight or less.

Since the material for molding an interlayer film for laminated glass is provided with the above configuration, it is possible to enhance the pour stability at the time of extrusion during production of the interlayer film for laminated glass.

It is preferred that the thermoplastic (meth)acrylic polymer be a polymer contained in a cured product obtained by curing a polymerizable composition containing a (meth)acrylic monomer and a photopolymerization initiator by irradiation with an active energy ray.

Examples of the method that satisfies the configuration (1), the configuration (2), the configuration (1') or the configuration (2') include the following methods. A method of curing the polymerizable composition by irradiation with an active energy ray having a specific wavelength. A method of making the polymerizable composition contains a light absorber having a specific wavelength, and curing the polymerizable composition. A method of curing the polymerizable composition in a thickness of 1 mm or less. A method of curing the polymerizable composition using a member having a function of cutting a specific wavelength such as soda glass. By appropriately combining these methods, the configuration (1), the configuration (2), the configuration (1') or the configuration (2') can be satisfied.

The interlayer film according to the present invention has a one-layer structure or a two or more-layer structure. The interlayer film according to the present invention may have a one-layer structure or may have a two or more-layer structure. The interlayer film according to the present invention may have a two-layer structure, may have a three-layer structure, or may have a three or more-layer structure. The interlayer film according to the present invention includes a first layer. The interlayer film according to the present invention may be a single-layered interlayer film including only a first layer or may be a multi-layered interlayer film including a first layer and other layer.

The interlayer film may have only a first layer, or may include a second layer in addition to the first layer. It is preferred that the interlayer film include a second layer as a surface layer of the interlayer film. It is preferred that the second layer be a surface layer of the interlayer film. When the interlayer film includes the second layer, the second layer is arranged on a first surface side of the first layer.

The interlayer film may have a three or more-layer structure and may include a third layer in addition to the first layer and the second layer. It is preferred that the interlayer film include a third layer as a surface layer of the interlayer film. It is preferred that the third layer be a surface layer of the interlayer film. When the interlayer film includes the second layer and the third layer, the third layer is arranged on a second surface side opposite to the first surface of the first layer.

Hereinafter, specific embodiments of the present invention will be described with reference to the drawings.

FIG. 1 is a sectional view schematically showing an interlayer film for laminated glass in accordance with a first embodiment of the present invention.

An interlayer film 11 shown in FIG. 1 is a multi-layered interlayer film having a two or more-layer structure. The interlayer film 11 is used for obtaining laminated glass. The interlayer film 11 is an interlayer film for laminated glass. The interlayer film 11 includes a first layer 1, a second layer 2 and a third layer 3. The interlayer film 11 has a three-layer structure. The second layer 2 is arranged on a first surface 1a of the first layer 1 to be layered thereon. The third layer 3 is arranged on a second surface 1b opposite to the first surface 1a of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (second layer 2/first layer 1/third layer 3) in which the second layer 2, the first layer 1, and the third layer 3 are layered in this order.

In this connection, other layers may be arranged on the surface opposite to the first layer 1 of the second layer 2, and on the surface opposite to the first layer 1 of the third layer 3, respectively.

FIG. 2 is a sectional view schematically showing an interlayer film for laminated glass in accordance with a second embodiment of the present invention.

An interlayer film 11A shown in FIG. 2 is a single-layered interlayer film having a one-layer structure. The interlayer film 11A is a first layer. The interlayer film 11A is used for obtaining laminated glass. The interlayer film 11A is an interlayer film for laminated glass.

Hereinafter, the details of the interlayer film according to the present invention, the polymerizable composition, the first layer, the second layer and the third layer, and each ingredient used in the interlayer film will be described.
(Thermoplastic (Meth)Acrylic Polymer)

The thermoplastic (meth)acrylic polymer is a (meth) acrylic polymer that softens and shows plasticity when heated, and hardens when cooled, for example, to an ambient temperature. The first layer contains a thermoplastic (meth)acrylic polymer (hereinafter, also referred to as a thermoplastic (meth)acrylic polymer (1)). The second layer may or may not contain a thermoplastic (meth)acrylic polymer. The third layer may or may not contain a thermoplastic (meth)acrylic polymer. One kind of each thermoplastic (meth)acrylic polymer contained in the first layer, the second layer and the third layer may be used alone, and two or more kinds thereof may be used in combination.

It is preferred that the thermoplastic (meth)acrylic polymer (1) be a polymer contained in a cured product obtained by curing a polymerizable composition containing a (meth) acrylic monomer and a photopolymerization initiator by irradiation with an active energy ray.

Hereinafter, components contained in the polymerizable composition are described.
<(Meth)Acrylic Monomer>

The polymerizable composition contains a (meth)acrylic monomer. It is preferred that the (meth)acrylic monomer have a (meth)acryloyl group. One kind of the (meth)acrylic monomer may be used alone, and two or more kinds thereof may be used in combination.

The (meth)acrylic monomer may contain a monofunctional (meth)acrylic monomer, or may contain a multifunctional (meth)acrylic monomer, or may contain both a monofunctional (meth)acrylic monomer and a multifunctional (meth)acrylic monomer.

Examples of the (meth)acrylic monomer include a (meth) acrylic ester and an N-substituted acrylamide having an amide group.

It is preferred that the (meth)acrylic monomer include an alicyclic (meth)acrylic ester, a (meth)acrylic ester having a cyclic ether structure, a (meth)acrylic ester having an aromatic ring, a (meth)acrylic ester having a polar group, an acyclic (meth)acrylic ester having 6 or less carbon atoms in the side chain, or an N-substituted acrylamide having an amide group. By using such a preferred (meth)acrylic ester or N-substituted acrylamide having an amide group, the effect of the present invention is effectively exerted, and both of the sound insulating property and the ability to prevent foaming can be enhanced in good balance.

Examples of the alicyclic (meth)acrylic ester include isobornyl (meth)acrylate, cyclohexyl (meth)acrylate, dicyclopentanyl (meth)acrylate, and the like. From the viewpoint of effectively obtaining the effect of the present invention, it is preferred that the alicyclic (meth)acrylic ester be isobornyl (meth)acrylate.

Examples of the (meth)acrylic ester having a cyclic ether structure include glycidyl (meth)acrylate, 2-hydroxyethyl (meth)acrylate glycidyl ether, 3-hydroxypropyl (meth)acrylate glycidyl ether, 4-hydroxybutyl acrylate glycidyl ether, 5-hydroxypentyl (meth)acrylate glycidyl, 6-hydroxyhexyl (meth)acrylate glycidyl ether; (3-methyloxetane-3-yl) methyl (meth)acrylate, (3-propyloxetane-3-yl)methyl (meth)acrylate, (3-ethyloxetane-3-yl)methyl (meth)acrylate, (3-butyloxetane-3-yl)methyl (meth)acrylate, (3-ethyloxetane-3-yl)ethyl (meth)acrylate, (3-ethyloxetane-3-yl)propyl (meth)acrylate, (3-ethyloxetane-3-yl)butyl (meth)acrylate, (3-ethyloxetane-3-yl)pentyl (meth)acrylate, (3-ethyloxetane-3-yl)hexyl (meth)acrylate; tetrahydrofurfuryl (meth) acrylate, (2,2-dimethyl-1,3-dioxolanedioxolane-4-yl)methyl (meth)acrylate, (2-methyl-2-ethyl-1,3-dioxolane-4-yl) methyl (meth)acrylate, (2-methyl-2-isobutyl-1,3-dioxolane-4-yl)methyl (meth)acrylate, (2-cyclohexyl-1,3-dioxolane-4-yl)methyl (meth)acrylate, tetrahydrofurfuryl alcohol acrylic acid multimer ester; tetrahydro-2H-pyran-2-yl-(meth)acrylate, 2-{1-[(tetrahydro-2H-pyran-2-yl)oxy]-2-methylpropyl}(meth)acrylate, cyclic trimethylol propane formal acrylate, (meth)acryloyl morpholine and the like. From the viewpoint of effectively obtaining the effect of the present invention, it is preferred that the (meth)acrylic ester having a cyclic ether structure be tetrahydrofurfuryl (meth)acrylate, or cyclic trimethylol propane formal acrylate.

Examples of the (meth)acrylic ester having an aromatic ring include benzyl acrylate, phenoxyethyl acrylate, phenoxypolyethyleneglycol acrylate, and the like.

Examples of the (meth)acrylic ester having a polar group include (meth)acrylic esters having a hydroxyl group, an amide group, an amino group, an isocyanate group, a carboxyl group or the like as the polar group.

Examples of the (meth)acrylic ester having a hydroxyl group include 2-hydroxyethyl (meth)acrylate, hydroxypropyl (meth)acrylate, 4-hydroxybutyl (meth)acrylate, 2-hydroxybutyl (meth)acrylate and the like.

Examples of the (meth)acrylic ester having an isocyanate group include 2-isocyanato ethyl(meth)acrylate, triallylisocyanurate, and derivatives thereof and the like.

Examples of the (meth)acrylic ester having a carboxyl group include acrylic acid, ω-carboxy-polycaprolactone monoacrylate, 2-acryloyloxyethylsuccinic acid.

The above-described (meth)acrylic ester may be a polycarboxylic ester having a (meth)acryloyl group. Examples of the polycarboxylic ester having a (meth)acryloyl group include 2-acryloyloxyethyl succinate and the like.

Examples of the acyclic (meth)acrylic ester having 6 or less carbon atoms in the side chain include methyl (meth) acrylate, ethyl (meth)acrylate, propyl (meth)acrylate, butyl (meth)acrylate, isobutyl (meth)acrylate, t-butyl (meth)acrylate and the like.

From the viewpoint of effectively suppressing deterioration in sound insulating property of laminated glass, it is preferred that the content of the acyclic (meth)acrylic ester having 8 or more carbon atoms in the side chain in 100% by weight of the polymerizable component be less than 50% by weight.

Examples of the N-substituted acrylamide having an amide group include N,N-dimethylaminopropyl (meth)acrylamide, N,N-dimethyl (meth)acrylamide, (meth)acryloyl morpholine, N-isopropyl (meth)acrylamide, N-hydroxyethyl (meth)acrylamide and the like.

Examples of the (meth)acrylic ester include besides the compounds as recited above, diethyleneglycol monoethylether (meth)acrylate, 3-methoxybutyl (meth)acrylate, 2-acryloyloxyethyl-2-hydroxypropylphthalate, 2-acryloyloxyethyl-2-hydroxylpropylphthalate, ethylene glycol di(meth) acrylate, diethylene glycol di(meth)acrylate, tetraethylene glycol di(meth)acrylate, 1,6-hexane diol di(meth)acrylate, 1,9-nonane diol di(meth)acrylate, polytetramethylene glycol di(meth)acrylate, neopentyl glycol di(meth)acrylate, 1,3-butylene glycol di(meth)acrylate, 2,2-bis[4-(acryloxyethoxy)phenyl]propane di(meth)acrylate; trimethylolpropane tri(meth)acrylate, pentaerythritol tri(meth)acrylate, pentaerythritol tetra(meth)acrylate, dipentaerythritol penta (meth)acrylate, dipentaerythritol hexa(meth)acrylate, tri(2-acryloyloxyethyl)phosphate, tetramethylol methane tri (meth)acrylate, tetramethylol propane tetra(meth)acrylate, and derivatives thereof and the like.

As to each of the (meth)acrylic ester and the N-substituted acrylamide having an amide group, one kind thereof may be used alone, and two or more kinds thereof may be used in combination. The thermoplastic (meth)acrylic polymer may be a homopolymer of the above-described (meth)acrylic ester, or may be a copolymer of a polymerizable component containing the above-described (meth)acrylic ester.

In 100% by weight of the polymerizable composition, a content of the (meth)acrylic monomer is preferably 40% by weight or more, more preferably 60% by weight or more and is preferably 99.99% by weight or less, more preferably 80% by weight or less. When the content of the (meth)acrylic monomer is the above lower limit or more and the above upper limit or less, it is possible to reduce the amount of unreacted (meth)acrylic monomers.

In 100% by weight of the first layer, a content of the (meth)acrylic monomer is preferably 3% by weight or less, more preferably 1% by weight or less, further preferably 0.5% by weight or less. The (meth)acrylic monomer in the first layer is, for example, a (meth)acrylic monomer that failed to react when the polymerizable composition was cured, and is a (meth)acrylic monomer remaining in the first layer. The (meth)acrylic monomer remaining in the cured product is likely to be a reaction origin in the mold. In this case, a larger molecular weight distribution ratio of the (meth)acrylic polymer may render foaming in laminated glass easy to occur, and cause gelation of the (meth)acrylic polymer, resulting that the melting viscosity is excessively high, and the pour stability at the time of extrusion is likely to deteriorate. Therefore, it is desired that the content of the (meth)acrylic monomer in the cured product be as small as possible, and the content of the (meth)acrylic monomer in 100% by weight of the first layer be as small as possible.

When the (meth)acrylic monomer contains the multifunctional (meth)acrylic monomer, the content of the multifunctional (meth)acrylic monomer in 100% by weight of the first layer is preferably less than 0.05% by weight, more preferably 0.02% by weight or less. When the content of the multifunctional (meth)acrylic monomer satisfies the above upper limit, it is possible to prevent occurrence of foaming more effectively, and it is possible to exert the effect of the present invention more effectively. It is desired that the content of the multifunctional (meth)acrylic monomer in 100% by weight of the first layer be as small as possible.

In 100% by weight of the cured product, a content of the (meth)acrylic monomer is preferably 5% by weight or less, more preferably 3% by weight or less, further preferably 1% by weight or less. The (meth)acrylic monomer in the cured product is, for example, a (meth)acrylic monomer that failed to react when the polymerizable composition was cured, and is a (meth)acrylic monomer remaining in the cured product. The (meth)acrylic monomer remaining in the cured product is likely to be a reaction origin in the mold. In this case, a larger molecular weight distribution ratio of the (meth) acrylic polymer may render foaming in laminated glass easy to occur, and cause gelation of the (meth)acrylic polymer, resulting that the melting viscosity is excessively high, and the pour stability at the time of extrusion is likely to deteriorate. Therefore, it is desired that the content of the (meth)acrylic monomer in 100% by weight of the cured product be as small as possible. In this case, the content of the (meth)acrylic monomer in the first layer can be reduced effectively.

When the (meth)acrylic monomer contains the multifunctional (meth)acrylic monomer, the content of the multifunctional (meth)acrylic monomer in 1001% by weight of the cured product is preferably less than 0.05% by weight, more preferably 0.02% by weight or less. When the content of the multifunctional (meth)acrylic monomer satisfies the above upper limit, it is possible to prevent occurrence of foaming more effectively, and it is possible to exert the effect of the present invention more effectively. It is desired that the content of the multifunctional (meth)acrylic monomer in 100% by weight of the cured product be as small as possible.

The content of the (meth)acrylic monomer and the content of the multifunctional (meth)acrylic monomer in 100% by weight of the first layer and in 100% by weight of the cured product can be measured, for example, by the following method of (1) or (2). (1) A method of measuring a residue on evaporation using gas chromatograph—mass spectrometer (GC/MS, for example, "JMS-Q1500GC" available from JEOL Ltd.) and calculating the content of the (meth)acrylic monomer and the content of the multifunctional (meth) acrylic monomer. (2) A method of measuring a weight decrement at 170° C. using a thermogravimetry—differential thermal analyzer (TG/DTA, for example, "STA7300" available from Hitachi High-Tech Science Corporation), and calculating the content of the (meth)acrylic monomer and the content of the multifunctional (meth)acrylic monomer.

<Photopolymerization Initiator>

The polymerizable composition contains a photopolymerization initiator.

Specific examples of the photopolymerization initiator include 2,2-dimethoxy-1,2-diphenylethane-1-one, 2-methyl-1-(4-methylthiophenyl)-2-morpholinopropane-1-one, 2-benzyl-2-dimethylamino-1-(4-morpholinophenyl)-butanone-1, 2-(dimethylamino)-2-[(4-methylphenyl) methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, bis(η5-2,4-cyclopentadiene-1-yl)-bis(2,6-difluoro-3-(1H-pyrrole-1-yl)-phenyl)titanium, 2-methyl-1-(4-methylthiophenyl)-2-morpholinopropane-1-one, 2-benzyl-2-dimethylamino-1-(4-morpholinophenyl)-butanone-1, 2-(dimethylamino)-2-[(4-methylphenyl)methyl]-1-[4-(4-morpholinyl)phenyl]-1-butanone, diethoxyacetophenone, 2-hydroxy-2-methyl-1-phenylpropane-1-one, benzyldimethylketal, 4-(2-hydroxyethoxy)phenyl-(2-hydroxy-2-propyl)ketone, 1-hydroxycyclohexylphenylketone, 2-methyl-2-morpholino (4-thiomethylphenyl)propane-1-one, 2-benzyl-2-dimethylamino-1-(4-morpholinophenyl)butanone, 2-hydroxy-2-methyl-1-[4-(1-methylvinyl)phenyl]propanone oligomer, benzoin, benzoin methyl ether, benzoin ethyl ether, benzoin isopropyl ether, benzoin isobutyl ether, benzophenone, methyl o-benzoylbenzoate, 4-phenylbenzophenone, 4-benzoyl-4'-methyl-diphenylsulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy)ethyl]benzene methanaminium bromide, (4-benzoylbenzyl)trimethylammonium chloride, 2-isopropylthioxanthone, 4-isopropylthioxanthone, 2,4-diethylthioxanthone, 2,4-dichlorothioxanthone, 1-chloro-4-propoxythioxanthone, 2-(3-dimethylamino-2-hydroxy)-3,4-dimethyl-9H-thioxanthone-9-one methochloride, 2,4,6-trimethylbenzoyl-diphenylphosphine oxide, bis(2,6-dimethoxybenzoyl)-2,4,4-trimethyl-pentylphosphine oxide, bis(2,4,6-trimethylbenzoyl)-phenylphosphine oxide, triphenylmethylium tetrakis(pentafluorophenyl) borate and the like. Only one kind of the photopolymerization initiator may be used, and two or more kinds thereof may be used in combination.

In 100% by weight of the polymerizable composition, a content of the photopolymerization initiator is preferably 0.01% by weight or more, more preferably 0.1% by weight or more and is preferably 10% by weight or less, more preferably 5% by weight or less. When the content of the photopolymerization initiator is in the range from the above-described lower limit to the above-described upper limit, the photocurability and the storage stability further increase.

<Ultraviolet Absorber>

It is preferred that the polymerizable composition contain an ultraviolet absorber. The polymerizable composition containing the ultraviolet absorber is capable of effectively absorbing the wavelength in the ultraviolet region of the active energy ray, so that the (meth)acrylic monomer can be favorably polymerized at a specific wavelength. Therefore, it is possible to control the molecular weight distribution ratio (weight average molecular weight/number average molecular weight) and the gel fraction of the obtained thermoplastic (meth)acrylic polymer favorably, and it is possible to exert the effect of the present invention more effectively.

Examples of the ultraviolet absorber include an ultraviolet absorber having a benzotriazole structure, an ultraviolet absorber having a benzophenone structure, an ultraviolet absorber having a triazine structure, and an ultraviolet absorber having a malonic ester, and the like. One kind of the ultraviolet absorber may be used alone, and two or more kinds thereof may be used in combination.

Examples of the ultraviolet absorber having a benzotriazole structure include ultraviolet absorbers having a benzotriazole structure such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), 2-[4-(2-hydroxy-3-dodecyloxy-propyl)oxy-2-hydroxyphenyl]-4,6-[bis(2,4-dimethylphenyl)-1,3,5-triazine ("Tinuvin400" available from BASF Japan Ltd.), and 2,4-bis[2-hydroxy-4-butoxyphenyl]-6-(2,4-dibutoxyphenyl)-1,3-5-triazine ("Tinuvin460" available from BASF Japan Ltd.).

Examples of the ultraviolet absorber having a benzophenone structure include octabenzone ("Chimassorb 81" available from BASF Japan Ltd.), and the like.

Examples of the ultraviolet absorber having a triazine structure include "LA-F70" available from ADEKA CORPORATION, and 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet absorber having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

A maximum absorption wavelength in wavelengths of 300 nm or more of the photopolymerization initiator is designated as $\lambda_1$ nm. A maximum absorbance in wavelengths of 280 nm or more of the ultraviolet absorber is designated as A, and a wavelength that satisfies A/4 and is larger than $\lambda_1$ is designated as $\lambda_2$ nm. The shape of the absorption spectrum of the ultraviolet absorber is usually approximately convex, there can be two wavelengths that satisfy A/4. $\lambda_2$ is a larger wavelength of the wavelengths that satisfy A/4, and is a wavelength larger than $\lambda_1$. It is preferred that the combination of the photopolymerization initiator and the ultraviolet absorber be such a combination that difference between $\lambda_2$ and $\lambda_1$ is 40 nm or less. In this case, it is possible to control the molecular weight distribution ratio (weight average molecular weight/number average molecular weight) and the gel fraction of the obtained thermoplastic (meth)acrylic polymer favorably, and as a result, it is possible to prevent foaming of laminated glass more effectively, and it is possible to exert the effect of the present invention more effectively.

From the viewpoint of exerting the effect of the present invention still more effectively, the difference between $\lambda_2$ and $\lambda_1$ is preferably 30 nm or less, more preferably 20 nm or less. It is desired that the difference between $\lambda_2$ and $\lambda_1$ be as small as possible.

In 100% by weight of the polymerizable composition, the content of the ultraviolet absorber is preferably 0.005% by weight or more, more preferably 0.01% by weight or more and is preferably 0.2% by weight or less, more preferably 0.12% by weight or less. When the content of the ultraviolet absorber is the above lower limit or more and the above upper limit or less, it is possible to favorably control the molecular weight distribution ratio (weight average molecular weight/number average molecular weight) of the obtained thermoplastic (meth)acrylic polymer, and as a result, it is possible to effectively prevent foaming of laminated glass, and it is possible to exert the effect of the present invention still more effectively.

<Light Absorber Other than Ultraviolet Absorber>

It is preferred that the polymerizable composition contain a light absorber other than an ultraviolet absorber. The polymerizable composition containing the light absorber other than an ultraviolet absorber is capable of effectively absorbing the wavelength in the ultraviolet region of the active energy ray, so that the (meth)acrylic monomer can be favorably polymerized well at a specific wavelength. Therefore, it is possible to control the molecular weight distribution ratio (weight average molecular weight/number average molecular weight) and the gel fraction of the obtained thermoplastic (meth)acrylic polymer favorably, and as a result, it is possible to prevent foaming of laminated glass more effectively, and it is possible to exert the effect of the present invention more effectively.

Examples of the light absorber other than an ultraviolet absorber include a polymerization inhibitor such as styrenic resins and quinonic compounds, and a chain transfer agent or the like. One kind of the light absorber other than an ultraviolet absorber may be used alone, and two or more kinds thereof may be used in combination.

A maximum absorption wavelength in wavelengths of 300 nm or more of the photopolymerization initiator is designated as $\lambda_1$ nm. A maximum absorbance in wavelengths of 280 nm or more of the light absorber other than an ultraviolet absorber is designated as B, and a wavelength that satisfies B/4 and is larger than $\lambda_1$ is designated as $\lambda_3$ nm. The shape of the absorption spectrum of the light absorber other than an ultraviolet absorber is usually approximately convex, there can be two wavelengths at which B/4 is satisfied. $\lambda_3$ is a larger wavelength of the wavelengths at which B/4 is satisfied, and is a wavelength larger than $\lambda_1$. It is preferred that the combination of the photopolymerization initiator and the light absorber other than an ultraviolet absorber be such a combination that difference between $\lambda_3$ and $\lambda_1$ is 60 nm or less. In this case, it is possible to control the molecular weight distribution ratio (weight average molecular weight/number average molecular weight) and the gel fraction of the obtained thermoplastic (meth)acrylic polymer favorably, and as a result, it is possible to prevent foaming of laminated glass more effectively, and it is possible to exert the effect of the present invention more effectively.

From the viewpoint of preventing foaming of laminated glass more effectively, and from the viewpoint of exerting the effect of the present invention more effectively, difference between $\lambda_3$ and $\lambda_1$ is preferably 10 nm or more, more preferably 20 nm or more, and is preferably 75 nm or less, more preferably 60 nm or less.

In 100% by weight of the polymerizable composition, a content of the light absorber other than an ultraviolet absorber is preferably 1% by weight or more, more preferably 5% by weight or more and is preferably 30% by weight or less, more preferably 10% by weight or less. When the content of the light absorber other than an ultraviolet absorber is the above lower limit or more and the above upper limit or less, it is possible to favorably control the molecular weight distribution ratio (weight average molecular weight/number average molecular weight) and the gel fraction of the obtained thermoplastic (meth)acrylic polymer, and as a result, it is possible to effectively prevent foaming of laminated glass, and it is possible to exert the effect of the present invention still more effectively. When the light absorber other than an ultraviolet absorber is the styrenic resin, the content of the styrenic resin in 100% by weight of the polymerizable composition is preferably 10% by weight or more, more preferably 30% by weight or more, and is preferably 100% by weight or less, more preferably 70% by weight or less. When the light absorber other than an ultraviolet absorber is the chain transfer agent or the like, the content of the chain transfer agent or the like in 100% by weight of the polymerizable composition is preferably 0.001% by weight or more, more preferably 0.01% by weight or more, and is preferably 5% by weight or less, more preferably 0.5% by weight or less.

<Polymerization Inhibitor>

The polymerizable composition may contain the polymerization inhibitor. Since the polymerizable composition containing the polymerization inhibitor is capable of preventing excessive polymerization of the (meth)acrylic monomer, it is possible to favorably control the weight average molecular weight and the number average molecular weight of the obtained thermoplastic (meth)acrylic polymer.

Examples of the polymerization inhibitor include hydroquinone, methoquinone, and 2,6-di-t-butyl-p-cresol (BHT), and the like. In this connection, BHT functions also as an oxidation inhibitor. One kind of the polymerization inhibitor may be used alone, and two or more kinds thereof may be used in combination.

In 100% by weight of the polymerizable composition, a content of the polymerization inhibitor is preferably 0.01% by weight or more, more preferably 0.1% by weight or more and is preferably 3% by weight or less, more preferably 1% by weight or less. When the content of the polymerization inhibitor is the above lower limit or more, it is possible to prevent excessive polymerization of the (meth)acrylic monomer. When the content of the polymerization inhibitor is the above upper limit or less, it is possible to make the polymerization of the (meth)acrylic monomer proceed favorably.

<Auxiliary>

The polymerizable composition may contain an auxiliary.

Examples of the auxiliary include triethanol amine, triisopropanol amine, 4,4'-dimethylaminobenzophenone (Michler's ketone), 4,4'-diethylaminobenzophenone, 2-dimethylaminoethylbenzoic acid, ethyl 4-dimethylaminoethylbenzoate, (n-butoxy)ethyl 4-dimethylaminoethylbenzoate, isoamyl 4-dimethylaminoethylbenzoate, 2-ethylhexyl 4-dimethylaminoethylbenzoate, 2,4-diethylthioxanthone, 2,4-diisopropylthioxanthone and the like. One kind of the auxiliary may be used alone and two or more kinds thereof may be used in combination.

It is preferred that the auxiliary be benzyldimethylketal, 1-hydroxycyclohexylphenyl ketone, benzoylisopropyl ether, 4-(2-hydroxyethoxy)-phenyl(2-hydroxy-2-propyl) ketone, 2-hydroxy-2-methyl-1-phenylpropane-1-one, or triphenylmethylium tetrakis(pentafluorophenyl) borate.

A content of the auxiliary in 100'R by weight of the polymerizable composition is not particularly limited.

<Plasticizer>

The polymerizable composition may contain a plasticizer. Examples of the plasticizer include the later-described plasticizers.

<Other Details of Polymerizable Composition>

When a polymerizable composition layer obtained by applying the polymerizable composition in a thickness of 3 mm is cured by irradiation with an active energy ray of 350 mJ/cm$^2$, a maximum temperature of a surface of the polymerizable composition layer at the time of curing is preferably 125° C. or less, more preferably 110° C. or less, further preferably 100° C. or less. When the maximum temperature of the surface of the polymerizable composition layer at the time of curing is the above upper limit or less, it is possible to reduce the content of the (meth)acrylic monomer in 100% by weight of the first layer, and it is possible to effectively prevent the generation of creases in the cured product. It is preferred that the active energy ray in determination of the maximum temperature be an ultraviolet ray with an irradiation intensity of 5 mW/cm$^2$ or less. The maximum temperature of the surface of the polymerizable composition layer at the time of curing can be measured by using a radiation thermometer (for example, "IR-303" available from CUSTOM corporation).

When the polymerizable composition is cured by irradiation with an active energy ray to obtain a cured product layer having a thickness of 0.8 mm, and the cured product layer is measured for dynamic viscoelasticity under conditions of a frequency of 1 Hz and a shearing mode, a peak temperature of tan δ is preferably −10° C. or more, more preferably 5° C. or more and is preferably 100° C. or less, more preferably 70° C. or less. When the peak temperature of tan δ is the above lower limit or more and the above upper limit or less, it is possible to obtain the effect of the present invention still more effectively. It is preferred that the active energy ray in determination of the peak temperature of tan δ be an ultraviolet ray with an irradiation intensity of 4 mW/cm² and an irradiation energy of 2000 mJ/cm².

The dynamic viscoelasticity measurement is specifically conducted in the following manner.

The cured product layer is stored in an environment at a room temperature of 23±2° C. and a humidity of 25±5% for 12 hours, and then the viscoelasticity is measured by using a dynamic viscoelasticity measuring device. The measurement is conducted in the condition of raising the temperature from −50° C. to 200° C. at a temperature rising speed of 3° C./minute in a shearing mode, and in the condition of a frequency of 1 Hz and a strain of 1%.

Examples of the dynamic viscoelasticity measuring device include a viscoelasticity analyzer "DVA-200" available from IT Keisoku Seigyo Co. Ltd. and the like.

<Production Method of Thermoplastic (Meth)Acrylic Polymer>

By curing the polymerizable composition by irradiation with the active energy ray, the thermoplastic (meth)acrylic polymer can be obtained.

Examples of the active energy ray include an ultraviolet ray, an electron beam, and a microwave, and the like.

As an apparatus for irradiation of the active energy ray, it is preferred to use a photocuring apparatus such as an ultraviolet irradiation device. Examples of the ultraviolet irradiation device include a box-type device, and a belt-conveyer-type device, and the like. Examples of the ultraviolet lamp installed in the ultraviolet irradiation device include a superhigh-pressure mercury lamp, a high-pressure mercury lamp, a low-pressure mercury lamp, a chemical lamp, a metal halide lamp, an excimer lamp, a UV-LED and the like. The ultraviolet lamp is preferably a chemical lamp or a UV-LED.

The irradiation energy of the active energy ray is preferably 600 mJ/cm % or more, more preferably 1000 mJ/cm² or more, and is preferably 10000 mJ/cm² or less, more preferably 5000 mJ/cm² or less. When the irradiation energy of the active energy ray is the above lower limit or more, it is possible to reduce the amount of unreacted (meth)acrylic monomers. When the irradiation energy of the active energy ray is the above upper limit or less, the storage stability of the thermoplastic (meth)acrylic polymer increases.

The irradiation intensity of the ultraviolet irradiation is preferably 0.1 mW/cm % or more, more preferably 0.5 mW/cm² or more, further preferably 1 mW/cm² or more, especially preferably 2 mW/cm² or more. When the irradiation energy of the ultraviolet irradiation is the above lower limit or more, it is possible to reduce the amount of unreacted (meth)acrylic monomers.

When a maximum absorption wavelength in wavelengths of 300 nm or more of the photopolymerization initiator is defined as $\lambda_1$ nm, a maximum wavelength of the active energy ray is preferably $(\lambda_1+20)$ nm or more and is preferably $(\lambda_1+50)$ nm or less. In this case, it is possible to control the molecular weight distribution ratio (weight average molecular weight/number average molecular weight) and the gel fraction of the obtained thermoplastic (meth)acrylic polymer favorably, and as a result, it is possible to prevent foaming of laminated glass more effectively, and it is possible to exert the effect of the present invention more effectively.

<Details of Thermoplastic (Meth)Acrylic Polymer>

From the viewpoint of effectively preventing occurrence of foaming in laminated glass, and the viewpoint of effectively exerting the effect of the present invention, it is preferred that the molecular weight distribution ratio of the weight average molecular weight to the number average molecular weight (weight average molecular weight/number average molecular weight) of the thermoplastic (meth) acrylic polymer contained in the first layer (thermoplastic (meth)acrylic polymer (1)) be 1 or more and 6 or less.

From the viewpoint of preventing occurrence of foaming in laminated glass more effectively, and the viewpoint of exerting the effect of the present invention more effectively, it is preferred that the molecular weight distribution ratio of the weight average molecular weight to the number average molecular weight (weight average molecular weight/number average molecular weight) of the thermoplastic (meth) acrylic polymer (1) be 4.5 or less, more preferably 4 or less. The molecular weight distribution ratio (weight average molecular weight/number average molecular weight) of the thermoplastic (meth)acrylic polymer (1) may be 1.5 or more, 2 or more, 2.2 or more, or 2.5 or more. When the gel fraction of the thermoplastic (meth)acrylic polymer (1) is 5% by weight or less, the molecular weight distribution ratio (weight average molecular weight/number average molecular weight) of the thermoplastic (meth)acrylic polymer (1) need not fall within the above range. For example, when the gel fraction of the thermoplastic (meth)acrylic polymer (1) is 5% by weight or less, the molecular weight distribution ratio (weight average molecular weight/number average molecular weight) of the thermoplastic (meth)acrylic polymer (1) may be 35 or less, may be 15 or less, may be 10 or less, may be 9 or less, may be 8 or less, or may be 7 or less.

The weight average molecular weight of the thermoplastic (meth)acrylic polymer (1) is preferably 500000 or more, more preferably 700000 or more, further preferably 850000 or more, and is preferably 1900000 or less, more preferably 1400000 or less, further preferably 1100000 or less. When the weight average molecular weight of the thermoplastic (meth)acrylic polymer (1) is the above lower limit or more and the above upper limit or less, it is possible to obtain the effect of the present invention more effectively, and it is possible to effectively prevent occurrence of foaming in laminated glass prepared with the interlayer film according to the present invention.

The weight average molecular weight and the number average molecular weight refer to a weight average molecular weight and a number average molecular weight calculated on the standard sample equivalent basis, measured by gel permeation chromatography (GPC). Examples of the standard sample include polystyrene, polymethyl methacrylate, and polyethylene glycol, and the like. For example, in order to determine a weight average molecular weight and a number average molecular weight on the polystyrene equivalent basis, GPC measurement for a polystyrene standard sample having a known molecular weight is conducted.

When the polystyrene standard sample is used as the standard sample, nine samples having the following weight average molecular weights are used as the polystyrene standard sample ("Shodex Standard SM-105" available from SHOWA DENKO K.K.). Standard sample No. (weight average molecular weight) of each sample: S-1.3(1270), S-3.2(3180), S-6.9(6,940), S-22(21,800), S-53(52,500), S-333(333,000), S-609(609,000), S-1345(1,350,000), S-2704(2,700,000).

An approximate line obtained by plotting molecular weight with respect to elution time of a peak top of each standard sample is used as a calibration curve. The weight average molecular weight and the number average molecular weight may be determined by dissolving the thermoplastic (meth)acrylic polymer in tetrahydrofuran (THF) to prepare a solution of 0.2% by weight, and analyzing the solution with a GPC apparatus using tetrahydrofuran (THF) as an eluent. The weight average molecular weight and the number average molecular weight may be determined by dissolving the cured product in tetrahydrofuran (THF) to prepare a solution of 0.2% by weight, and analyzing the solution with a GPC apparatus using tetrahydrofuran (THF) as an eluent. The weight average molecular weight and the number average molecular weight may be determined by dissolving the first layer of the interlayer film (first layer obtained by peeling off the first layer when the interlayer film is a multilayer interlayer film) in tetrahydrofuran (THF) to prepare a solution of 0.2% by weight, and analyzing the solution with a GPC apparatus using tetrahydrofuran (THF) as an eluent. When the thermoplastic (meth)acrylic polymer, the cured product or the first layer contains a compound having an amide group, the solution of 0.2% by weight may be prepared by dissolving in dimethylformamide or N-methylpyrrolidone in place of tetrahydrofuran (THF). In this case, as an eluent, lithium bromide-containing dimethylformamide or lithium bromide-containing N-methylpyrrolidone may be used. When the interlayer film is used, it is preferred to prepare the solution after leaving the interlayer film to stand in a constant temperature and humidity room (humidity 30% (±3%), temperature 23° C.) for one month. The weight average molecular weight and the number average molecular weight can be analyzed by using the following GPC apparatus as a GPC apparatus.

GPC apparatus (available from Waters, R.I.: 2414, autosampler alliance: e2695, guard column: KF-G, column: two serially arranged Shodex KF806L).

When the first layer contains a thermoplastic resin other than the thermoplastic (meth)acrylic polymer (1), the weight average molecular weight and the number average molecular weight of the thermoplastic (meth)acrylic polymer (1) can be measured by separating the thermoplastic (meth) acrylic polymer (1) from the first layer. Examples of the method for separating the thermoplastic (meth)acrylic polymer (1) from the first layer include reprecipitation and the like. Also, as a method of separating by analysis, for example, a method of simultaneously measuring GPC, and NMR or FT-IR may be used.

From the viewpoint of effectively obtaining the effect of the present invention, it is preferred that the gel fraction of the thermoplastic (meth)acrylic polymer contained in the first layer (thermoplastic (meth)acrylic polymer (1)) be 5% by weight or less.

From the viewpoint of obtaining the effect of the present invention more effectively, the gel fraction of the thermoplastic (meth)acrylic polymer (1) is preferably 4% by weight or less, more preferably 3% by weight or less. It is preferred that the gel fraction be as small as possible. When the molecular weight distribution ratio (weight average molecular weight/number average molecular weight) of the thermoplastic (meth)acrylic polymer (1) be 1 or more and 6 or less, the gel fraction of the thermoplastic (meth)acrylic polymer (1) need not fall within the above range. For example, when the molecular weight distribution ratio (weight average molecular weight/number average molecular weight) of the thermoplastic (meth)acrylic polymer (1) is 1 or more and 6 or less, the gel fraction of the thermoplastic (meth)acrylic polymer (1) may be 15% by weight or less, may be 10% by weight or less, may be 9% by weight or less, may be 8% by weight or less, or may be 7% by weight or less.

The gel fraction can be determined in the following manner.

A thermoplastic (meth)acrylic polymer (0.15 g) is immersed in 30 g of tetrahydrofuran, and shaken and immersed at 23° C. for 36 hours. Then, the thermoplastic (meth)acrylic polymer is taken out through the filter of 200 meshes, and dried by heating at 110° C. for 1 hour. Then, the weight of the thermoplastic (meth)acrylic polymer is measured. The gel fraction can be calculated by the following formula (X). In the case where the monomer and the like constituting the thermoplastic (meth)acrylic polymer includes a compound having an amide group, gel may be generated when the thermoplastic (meth)acrylic polymer and tetrahydrofuran are mixed. In this case, gel fraction may be determined by using acetone, dimethylformamide or a mixed solvent thereof in place of tetrahydrofuran.

$$\text{Gel fraction (\% by weight)} = W2/W1 \times 100 \qquad \text{Formula (X)}$$

W1: weight of thermoplastic (meth)acrylic polymer before immersing thermoplastic (meth)acrylic polymer in tetrahydrofuran at 23° C.

W2: weight of thermoplastic (meth)acrylic polymer after taking out and drying thermoplastic (meth)acrylic polymer immersed in tetrahydrofuran at 23° C.

In 100% by weight of the first layer, a content of the thermoplastic (meth)acrylic polymer (1) is preferably 50% by weight or more, more preferably 60% by weight or more, and is preferably 99.99% by weight or less, more preferably 80% by weight or less.

(Thermoplastic Resin)

The first layer may contain a thermoplastic resin other than the thermoplastic (meth)acrylic polymer (1) (hereinafter, sometimes described as a thermoplastic resin (1)). It is preferred that the second layer contain a thermoplastic resin (hereinafter, sometimes described as a thermoplastic resin (2)). It is preferred that the third layer contain a thermoplastic resin (hereinafter, sometimes described as a thermoplastic resin (3)). The thermoplastic resin (1), the thermoplastic resin (2), and the thermoplastic resin (3) may be the same or different from one another. From the viewpoint of further enhancing the production efficiency of the interlayer film, it is preferred that the thermoplastic resin (2) and the thermoplastic resin (3) be the same thermoplastic resin. One kind of each of the thermoplastic resin (1), the thermoplastic resin (2) and the thermoplastic resin (3) may be used alone, and two or more kinds thereof may be used in combination.

Examples of the thermoplastic resin include polyvinyl acetate, a polyester resin, a polyvinyl acetal resin, a vinyl acetate resin, polystyrene, an ethylene-vinyl acetate copolymer resin, an ethylene-acrylic acid copolymer resin, a polyurethane resin, an ionomer resin, a polyvinyl alcohol resin, and a polyolefin resin such as aliphatic polyolefin. The polyoxymethylene (or polyacetal) resin is included in the polyvinyl acetal resin. Thermoplastic resins other than these may be used as the above resins. The thermoplastic resin may be a thermoplastic elastomer.

The thermoplastic resin means a resin that softens and exhibits plasticity when it is heated, and hardens, for example, when it is cooled to room temperature (25° C.). Among the thermoplastic resins, especially the thermoplastic elastomer means a resin that softens and exhibits plasticity when it is heated, and hardens to exhibits rubber elasticity, for example, when it is cooled to room temperature (25° C.).

The thermoplastic resins exemplified above can be a thermoplastic elastomer by adjusting the molecular structure, the polymerization degree and the like of the resin.

From the viewpoint of further enhancing the transparency, the sound insulating property and the penetration resistance of laminated glass, it is more preferred that the thermoplastic resin (1), the thermoplastic resin (2) and the thermoplastic resin (3) each be a polyvinyl acetal resin.

<Polyvinyl Acetal Resin>

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70% by mole to 99.97% by mole.

The average polymerization degree of the polyvinyl alcohol (PVA) is preferably 200 or more, more preferably 500 or more, still more preferably 1500 or more, further preferably 1600 or more, and is preferably 5000 or less, more preferably 4000 or less, further preferably 3500 or less, especially preferably 3000 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is preferably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, and benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone, and two or more kinds thereof may be used in combination.

The content of the hydroxyl group (the amount of hydroxyl groups) of the polyvinyl acetal resin is preferably 15% by mole or more, more preferably 18% by mole or more, and preferably 40% by mole or less, and more preferably 35% by mole or less. When the content of the hydroxyl group is the above lower limit or more, the adhesive strength of the interlayer film is further enhanced. Moreover, when the content of the hydroxyl group is the above upper limit or less, the flexibility of the interlayer film is enhanced and the handling of the interlayer film is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree of the polyvinyl acetal resin is preferably 0.01% by mole or more, more preferably 0.5% by mole or more, and preferably 10% by mole or less, and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (the butyralization degree in the case of a polyvinyl butyral resin) is preferably 55% by mole or more, more preferably 60% by mole or more and is preferably 75% by mole or less, and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

(Plasticizer)

It is preferred that the interlayer film contain a plasticizer. The first layer (including a single-layered interlayer film) may or may not contain a plasticizer (hereinafter, sometimes described as a plasticizer (1)). The first layer may contain a plasticizer by containing the plasticizer in the polymerizable composition. It is preferred that the second layer contain a plasticizer (hereinafter, sometimes described as a plasticizer (2)). It is preferred that the third layer contain a plasticizer (hereinafter, sometimes described as a plasticizer (3)). By the use of the plasticizer or by using a polyvinyl acetal resin and a plasticizer together, the impact resistance and the penetration resistance are further improved, and the adhesive strength of a layer containing the polyvinyl acetal resin and the plasticizer to a lamination glass member or another layer is moderately increased. The plasticizer is not particularly limited. One kind of each of the plasticizer (1), the plasticizer (2) and the plasticizer (3) may be the same or different from one another. One kind of each of the plasticizer (1), the plasticizer (2) and the plasticizer (3) may be used alone, and two or more kinds thereof may be used in combination.

Examples of the plasticizer include organic ester plasticizers such as a monobasic organic acid ester and a polybasic organic acid ester, and organic phosphate plasticizers such as an organic phosphate plasticizer and an organic phosphite plasticizer, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, and tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, and decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, and azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, and a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, and triisopropyl phosphate, and the like.

It is preferred that the plasticizer be a diester plasticizer represented by the following formula (1).

[Chemical 1]

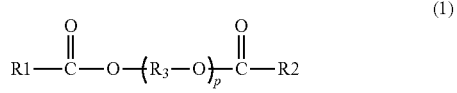

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula. (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate. It is more preferred that the plasticizer include triethylene glycol di-2-ethylhexanoate or triethylene glycol di-2-ethylbutyrate, and it is further preferred that the plasticizer include triethylene glycol di-2-ethylhexanoate.

In the above first layer, the content of the plasticizer (1) per 100 parts by weight of the thermoplastic (meth)acrylic polymer (1) is referred to as a content (1). The content (1) is preferably 0.5 parts by weight or more, more preferably 15 parts by weight or more, further preferably 20 parts by weight or more, and is preferably 120 parts by weight or less, more preferably 100 parts by weight or less, further preferably 80 parts by weight or less. The content (1) may be 0 parts by weight (not contained). When the content (1) is the above lower limit or more, it is possible to prevent delamination of the interlayer film more effectively, and it is possible to further enhance the sound insulating property of laminated glass. When the content (1) is the above upper limit or less, the penetration resistance of laminated glass is further enhanced.

In the second layer, the content of the plasticizer (2) relative to 100 parts by weight of the thermoplastic resin (2) is referred to as a content (2). The content (2) is preferably 10 parts by weight or more, more preferably 20 parts by weight or more, further preferably 25 parts by weight or more, and is preferably 100 parts by weight or less, more preferably 80 parts by weight or less, further preferably 50 parts by weight or less. When the content (2) is the above lower limit or more, it is possible to enhance the tensile strength of the interlayer film, and it is possible to enhance the penetration resistance of laminated glass. When the content (2) is the above upper limit or less, it is possible to further enhance the sound insulating property of laminated glass. When the content (2) is the above upper limit or less, the flexural rigidity is further enhanced.

In the third layer, the content of the plasticizer (3) relative to 100 parts by weight of the thermoplastic resin (3) is referred to as a content (3). The content (3) is preferably 10 parts by weight or more, more preferably 20 parts by weight or more, further preferably 25 parts by weight or more, and is preferably 100 parts by weight or less, more preferably 80 parts by weight or less, further preferably 50 parts by weight or less. When the content (3) is the above lower limit or more, it is possible to enhance the tensile strength of the interlayer film, and it is possible to enhance the penetration resistance of laminated glass. When the content (3) is the above upper limit or less, it is possible to further enhance the sound insulating property of laminated glass. When the content (3) is the above upper limit or less, the flexural rigidity is further enhanced.

The content (1) and the content (2) may be the same or different from each other. The content (1) and the content (3) may be the same or different from each other. From the viewpoint of enhancing the sound insulating property of laminated glass, it is preferred that the content (1) and the content (2) be the same, or the content (1) be larger than the content (2), and it is more preferred that the content (1) be larger than the content (2). From the viewpoint of enhancing the sound insulating property of laminated glass, it is preferred that the content (1) and the content (3) be the same, or the content (1) be larger than the content (3), and it is more preferred that the content (1) be larger than the content (3).

From the viewpoint of further enhancing the sound insulating property of laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

(Tackifier)

The first layer may or may not contain a tackifier. The first layer may contain a tackifier by containing the tackifier in the polymerizable composition. From the viewpoint of further improving the adhesivity of the first layer, with respect to the second and the third layers, and from the viewpoint of further enhancing the penetration resistance of laminated glass, it is preferred that the first layer contain a tackifier. Also, by containing the tackifier in the first layer, it is possible to enhance the sound insulating property of laminated glass. Further, by containing the tackifier in the first layer, it is also possible to enhance the sound insulating property in a high frequency region of laminated glass.

Examples of the tackifier include styrenic resins, a rosin resin, a terpene resin, and a petroleum resin, and the like. One kind of the tackifier may be used alone and two or more kinds thereof may be used in combination. Each of the second and the third layers may or may not contain a tackifier.

From the viewpoint of further enhancing the sound insulating property of laminated glass, it is preferred that the tackifier be a rosin resin.

The rosin resin is a resin based on rosin or a rosin derivative. Examples of the rosin resin include rosin, acid modified rosin, rosin-containing diol, rosin ester, hydrogenated rosin ester and maleic acid modified rosin ester, and the like. Examples of the acid modified rosin include acrylic acid modified rosin.

A content of the tackifier per 100 parts by weight of the thermoplastic (meth)acrylic polymer (1) in the first layer is preferably 10 parts by weight or more, more preferably 20 parts by weight or more, further preferably 25 parts by weight or more, especially preferably 30 parts by weight or more, most preferably 50 parts by weight or more. The content of the tackifier per 100 parts by weight of the thermoplastic (meth)acrylic polymer (1) in the first layer is preferably 500 parts by weight or less, more preferably 300 parts by weight or less, further preferably 100 parts by weight or less, especially preferably 90 parts by weight or less. When the content of the tackifier is the above lower limit or more, the sound insulating property of the laminated glass is further enhanced. If the content of the tackifier exceeds the above upper limit, the tackifier can be overabundant for improvement of the sound insulating property.

(Heat Shielding Substance)

The interlayer film may contain a heat shielding substance. The first layer may contain a heat shielding substance. The first layer may contain a heat shielding substance by containing the heat shielding substance in the polymerizable composition. The second layer may contain a heat shielding substance. The third layer may contain a heat shielding substance. One kind of the heat shielding substance may be used alone, and two or more kinds thereof may be used in combination.

The heat shielding substance may contain at least one kind of Ingredient X among a phthalocyanine compound, a naphthalocyanine compound, and an anthracyanine compound or contain heat shielding particles. In this case, the heat shielding substance may contain both of the Ingredient X and the heat shielding particles.

The Ingredient X is not particularly limited. Examples of the Ingredient X that can be used include a phthalocyanine compound, a naphthalocyanine compound and an anthracyanine compound that are conventionally known.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

The Ingredient X may contain a vanadium atom or a copper atom. The Ingredient X may contain a vanadium atom, and may contain a copper atom. The Ingredient X may be at least one kind of phthalocyanines containing a vanadium atom or a copper atom, and derivatives of phthalocyanine containing a vanadium atom or a copper atom.

The interlayer film may contain heat shielding particles. The first layer may contain heat shielding particles. The second layer may contain heat shielding particles. The third layer may contain heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

As the heat shielding particles, metal oxide particles may be used. As the heat shielding particles, particles formed of an oxide of metal (metal oxide particles) may be used.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used.

(Metal Salt)

The interlayer film may contain at least one kind of metal salt (hereinafter, sometimes described as metal salt M) of an alkali metal salt and an alkali earth metal salt. The alkali earth metal means six metals of Be, Mg, Ca, Sr, Ba, and Ra. The first layer may contain the metal salt M. The first layer may contain the metal salt M by containing the metal salt M in the polymerizable composition. The second layer may contain the metal salt M. The third layer may contain the metal salt M. By the use of the metal salt M, controlling the adhesivity between the interlayer film and a lamination glass member such as a glass plate or the adhesivity between respective layers in the interlayer film is facilitated. One kind of the metal salt M may be used alone, and two or more kinds thereof may be used in combination.

The metal salt M may contain at least one kind of metal selected from the group consisting of Li, Na, K, Rb, Cs, Mg, Ca, Sr and Ba.

As the metal salt M, an alkali metal salt of an organic acid having 2 to 16 carbon atoms, and an alkali earth metal salt of an organic acid having 2 to 16 carbon atoms can be used. The metal salt M may include a magnesium salt of a carboxylic acid having 2 to 16 carbon atoms, or a potassium salt of a carboxylic acid having 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, and potassium 2-ethylhexanoate, and the like.

(Ultraviolet Ray Screening Agent)

The interlayer film may contain an ultraviolet ray screening agent. The first layer may contain an ultraviolet ray screening agent. The first layer may contain an ultraviolet ray screening agent by containing the ultraviolet ray screening agent in the polymerizable composition. The second layer may contain an ultraviolet ray screening agent. The third layer may contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet absorber. It is preferred that the ultraviolet ray screening agent be an ultraviolet absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), and an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, and particles in which the surface of palladium particles is coated with silica, and the like. It is preferred that the ultraviolet ray screening agent not be heat shielding particles.

Examples of the ultraviolet ray screening agent containing a metal oxide include zinc oxide, titanium oxide, and cerium oxide, and the like. Furthermore, with regard to the ultraviolet ray screening agent containing a metal oxide, the surface may be coated. Examples of the coating material for the surface of the ultraviolet ray screening agent containing a metal oxide include an insulating metal oxide, a hydrolyzable organosilicon compound, and a silicone compound, and the like.

Examples of the insulating metal oxide include silica, alumina, and zirconia, and the like. For example, the insulating metal oxide has a band-gap energy of 5.0 eV or more.

Examples of the ultraviolet absorber (ultraviolet absorber) having a benzotriazole structure include ultraviolet absorbers having a benzotriazole structure such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), 2-[4-(2-hydroxy-3-dodecyloxy-propyl)oxy-2-hydroxyphenyl]-4,6-[bis(2,4-dimethylphenyl)-1,3,5-triazine ("Tinuvin400" available from BASF Japan Ltd.), and 2,4-bis[2-hydroxy-4-butoxyphenyl]-6-(2,4-dibutoxyphenyl)-1,3-5-triazine ("Tinuvin460" available from BASF Japan Ltd.).

Examples of the ultraviolet ray screening agent (ultraviolet absorber) having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), and 2-(2'-hydroxy-3',5'-di-amylphenyl)benzotriazole ("Tinuvin 328" available from BASF Japan Ltd.), and the like.

Examples of the ultraviolet ray screening agent (ultraviolet absorber) having a benzophenone structure include octabenzone ("Chimassorb 81" available from BASF Japan Ltd.), and the like.

Examples of the ultraviolet ray screening agent (ultraviolet absorber) having a triazine structure include "LA-F70" available from ADEKA CORPORATION, and 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent (ultraviolet absorber) having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent (ultraviolet absorber) having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxalanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

(Oxidation Inhibitor)

The interlayer film may contain an oxidation inhibitor. The first layer may contain an oxidation inhibitor. The first layer may contain an oxidation inhibitor by containing the oxidation inhibitor in the polymerizable composition. The second layer may contain an oxidation inhibitor. The third layer may contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, and a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

Examples of the phenol-based oxidation inhibitor include 2,6-di-t-butyl-p-cresol (BHT), butyl hydroxyanisole (BHA), 2,6-di-t-butyl-4-ethylphenol, stearyl 0-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, and 2,2'-methylenebis(4,6-di-t-butyl-1-phenyloxy) (2-ethylhexyloxy) phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., and "IRGANOX 1010" available from BASF Japan Ltd., and the like.

(Other Ingredients)

Each of the interlayer film, the polymerizable composition, the first layer, the second layer, and the third layer may contain additives such as a coupling agent, a dispersing agent, a surfactant, a flame retardant, an antistatic agent, an adhesive strength regulator other than metal salt, a moisture-resistance agent, a fluorescent brightening agent, and an infrared ray absorber, as necessary. One kind of these additives may be used alone, and two or more kinds thereof may be used in combination.

(Other Details of Interlayer Film for Laminated Glass)

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, and is preferably 3 mm or less, more preferably 1.5 mm or less. When the thickness of the interlayer film is the above lower limit or more, the penetration resistance and the flexural rigidity of laminated glass are further enhanced. When the thickness of the interlayer film is the above upper limit or less, the transparency of the interlayer film is further improved.

The thickness of the interlayer film is designated as T. The thickness of the first layer is preferably 0.005T or more, more preferably 0.01T or more, further preferably 0.02T or more, and is preferably 0.17T or less, more preferably 0.15T or less, still more preferably 0.13T or less, more preferably 0.1T or less, further preferably 0.08T or less. When the thickness is in the range from the aforementioned lower limit to the aforementioned upper limit, the sound insulating property is further enhanced in a wide range of temperature.

The thickness of each of the second layer and the third layer is 0.01T or more, further preferably 0.02T or more, and is preferably 0.17T or less, more preferably 0.15T or less, more preferably 0.13T or less, more preferably 0.1T or less, further preferably 0.08T or less. When the thickness is in the range from the aforementioned lower limit to the aforementioned upper limit, the sound insulating property is further enhanced in a wide range of temperature.

The interlayer film may be an interlayer film having a uniform thickness, or may be an interlayer film having varying thickness. The sectional shape of the interlayer film may be a rectangular shape and may be a wedge-like shape.

The interlayer film may be wound to be formed into a roll body of the interlayer film. The roll body may include a winding core and an interlayer film wound on the outer periphery of the winding core.

The distance between one end and the other end of the interlayer film is preferably 3 m or less, more preferably 2 m or less, especially preferably 1.5 m or less, and is preferably 0.5 m or more, more preferably 0.8 m or more, especially preferably 1 m or more.

The interlayer film according to the present invention is produced by extrusion molding. It is preferred that the method for producing an interlayer film include the following steps. A step of curing a polymerizable composition containing a (meth)acrylic monomer and a photopolymerization initiator by irradiation with an active energy ray to obtain a cured product containing a thermoplastic (meth)acrylic polymer. A step of extruding a first layer containing the thermoplastic (meth)acrylic polymer with an extruder in production of a single-layered interlayer film having only a first layer. A step of co-extruding a composition for forming a first layer containing the thermoplastic (meth)acrylic polymer and respective resin compositions for forming a second layer and a third layer with an extruder to laminate the layers in production of a multilayer interlayer film having the first, the second and the third layers.

For the reason of excellent production efficiency of the interlayer film, it is preferred that the second layer and the third layer contain the same polyvinyl acetal resin. For the reason of excellent production efficiency of the interlayer film, it is more preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method, an emboss roll method, a calender roll method, and a profile extrusion method, and the like. The emboss roll method is preferred because a large number of embosses of the protrusions and recesses, which is a quantitatively constant protrusion and recess pattern, can be formed.

(Laminated Glass)

The laminated glass according to the present invention includes a first lamination glass member, a second lamination glass member and the aforementioned interlayer film for laminated glass. In the laminated glass according to the present invention, the above-described interlayer film for laminated glass is arranged between the first lamination glass member and the second lamination glass member.

FIG. 3 is a sectional view schematically showing an example of laminated glass prepared with the interlayer film for laminated glass shown in FIG. 1.

A laminated glass 31 shown in FIG. 3 includes a first lamination glass member 21, a second lamination glass member 22 and the interlayer film 11. The interlayer film 11 is arranged between the first lamination glass member 21 and the second lamination glass member 22 to be sandwiched therebetween.

The first lamination glass member 21 is layered on a first surface 11a of the interlayer film 11. The second lamination glass member 22 is layered on a second surface 11b opposite to the first surface 11a of the interlayer film 11. The first lamination glass member 21 is layered on an outer surface 2a of the second layer 2. The second lamination glass member 22 is layered on an outer surface 3a of the third layer 3.

FIG. 4 is a sectional view schematically showing an example of laminated glass prepared with the interlayer film for laminated glass shown in FIG. 2.

A laminated glass 31A shown in FIG. 4 includes the first lamination glass member 21, the second lamination glass member 22 and the interlayer film 11A. The interlayer film 11A is arranged between the first lamination glass member 21 and the second lamination glass member 22 to be sandwiched therebetween.

The first lamination glass member 21 is layered on the first surface 11a of the interlayer film 11A. The second lamination glass member 22 is layered on the second surface 11b opposite to the first surface 11a of the interlayer film 11A.

It is preferred that the first lamination glass member be the first glass plate. It is preferred that the second lamination glass member be the second glass plate.

Examples of the first and second lamination glass members include a glass plate, and a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate including a glass plate, and it is preferred that at least one glass plate be used. It is preferred that each of the first lamination glass member and the second lamination glass member be a glass plate or a PET film, and the laminated glass include a glass plate as at least one among the first lamination glass member and the second lamination glass member. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and green glass, and the like. The organic glass is synthetic resin glass substituted for inorganic glass. Examples of the organic glass include a polycarbonate plate, and a poly(meth)acrylic resin plate, and the like. Examples of the poly(meth)acrylic resin plate include a polymethyl (meth)acrylate plate, and the like.

The thicknesses of each of the first lamination glass member and the second lamination glass member is preferably 1 mm or more, and is preferably 5 mm or less, and more preferably 3 mm or less. Moreover, when the lamination glass member is a glass plate, the thickness of the glass plate is preferably 0.5 mm or more, more preferably 0.7 mm or more, preferably 5 mm or less and more preferably 3 mm or less. When the lamination glass member is a PET film, the thickness of the PET film is preferably 0.03 mm or more and is preferably 0.5 mm or less.

The method for producing the laminated glass is not particularly limited. For example, the interlayer film is sandwiched between the first lamination glass member and the second lamination glass member, and then, passed through pressure rolls or subjected to decompression suction in a rubber bag, so that the air remaining between the first and the second lamination glass members and the interlayer film is removed. Afterward, the members are preliminarily bonded together at about 70° C. to 110° C. to obtain a laminate. Next, by putting the laminate into an autoclave or by pressing the laminate, the members are press-bonded together at about 120° C. to 150° C. and under a pressure of 1 MPa to 1.5 MPa. In this way, laminated glass can be obtained. At the time of producing the laminated glass, layers in the interlayer film may be laminated.

Each of the interlayer film and the laminated glass can be used for automobiles, railway vehicles, aircraft, ships, and buildings and the like. Each of the interlayer film and the laminated glass can also be used for applications other than these applications. It is preferred that the interlayer film and the laminated glass be an interlayer film and laminated glass for vehicles or for buildings respectively, and it is more preferred that the interlayer film and the laminated glass be an interlayer film and laminated glass for vehicles respectively. Each of the interlayer film and the laminated glass can be used for a windshield, side glass, rear glass or roof glass of an automobile, and the like. The interlayer film and the laminated glass are suitably used for automobiles. The interlayer film is suitably used for obtaining laminated glass of an automobile.

Hereinafter, the present invention will be described in more detail with reference to examples and comparative examples. The present invention is not limited only to these examples.

In polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

The following materials for polymerizable compositions were prepared.

((Meth)Acrylic Monomer)

MEDOL10: (2-methyl-2-ethyl-1,3-dioxolan-4-yl)methyl (meth)acrylate (available from OSAKA ORGANIC CHEMICAL INDUSTRY LTD.)

IBOA: isobornyl acrylate (available from NIPPON SHOKUBAI CO., LTD.)

CTFA (#200): cyclic trimethylolpropane formal acrylate (available from OSAKA ORGANIC CHEMICAL INDUSTRY LTD., VISCOAT #200)

4-Hydroxybutyl Acrylate

Acrylic acid (available from NIPPON SHOKUBAI CO., LTD.)

Dimethyl acrylamide (available from KJ Chemicals Corporation)

Butyl acrylate (available from NIPPON SHOKUBAI CO., LTD.)

2-ethylhexyl acrylate (available from NIPPON SHOKUBAI CO., LTD.)

(Photopolymerization Initiator)

IRGACURE 184 (Irg.184: 2,2-dimethoxy-1,2-diphenylethan-1-one, available from BASF, maximum absorption wavelength $\lambda_1$ in wavelengths of 300 nm or more: 326 nm)

(Other Resins)

Polyvinyl acetal resin (polymerization degree: 1700, acetylation degree: 12% by mole, content of hydroxyl group: 23% by mole)

(Ultraviolet Absorber)

Tinuvin 326 (2-(2'-hydroxy-3'-t-butyl-5-methylphenyl)-5-chlorobenzotriazole, available from BASF, wavelength $\lambda_2$ that satisfies A/4 and is larger than $\lambda_1$ when maximum absorbance in wavelengths of 280 nm or more of ultraviolet absorber is referred to as A: 384 nm)

Tinuvin 400 (2-[4-(2-hydroxy-3-dodecyloxy-propyl)oxy-2-hydroxyphenyl]-4,6-[bis(2,4-dimethylphenyl)-1,3,5-triazine, available from BASF, wavelength $\lambda_2$ that satisfies A/4 and is larger than $\lambda_1$ when maximum absorbance in wavelengths of 280 nm or more of ultraviolet absorber is referred to as A: 354 nm)

Tinuvin 460 (2,4-bis[2-hydroxy-4-butoxyphenyl]-6-(2,4-dibutoxyphenyl)-1,3-5-triazine, available from BASF, wavelength $\lambda_2$ that satisfies A/4 and is larger than $\lambda_1$ when maximum absorbance in wavelengths of 280 nm or more of ultraviolet absorber is referred to as A: 371 nm)

HOSTAVIN PR-25 (dimethyl (p-methoxybenzylidene) malonate, available from Clariant Chemicals, wavelength $\lambda_2$ that satisfies A/4 and is larger than $\lambda_1$ when maximum absorbance in wavelengths of 280 nm or more of ultraviolet absorber is referred to as A: 339 nm)

Benzophenone (available from FUJIFILM Wako Chemicals, wavelength $\lambda_2$ that satisfies A/4 and is larger than $\lambda_1$ when maximum absorbance in wavelengths of 280 nm or more of ultraviolet absorber is referred to as A: nonexistent)

The maximum absorption wavelength $\lambda_1$ of the photopolymerization initiator, and the wavelength $\lambda_2$ of the ultraviolet absorber were calculated in the following manner.

The photopolymerization initiator was dissolved in acrylonitrile such that the concentration in the obtained solution was 1.5% by weight. The ultraviolet absorber was dissolved in acrylonitrile such that the concentration in the obtained solution was 0.05% by weight. The obtained solution was applied in a quartz cell with an optical length of 10 mm, and an absorption spectrum in the region of 200 nm to 600 nm was measured by using a spectrophotometer ("U-4100" available from Hitachi, Ltd.) From the obtained absorption spectrum, maximum absorption wavelength $\lambda_1$ in wavelengths of 300 nm or more of the photopolymerization initiator, and maximum absorbance A in wavelengths of 280 nm or more of the ultraviolet absorber, and wavelength $\lambda_2$ that satisfies A/4 and is larger than $\lambda_1$ were read.

(Plasticizer)

Triethylene glycol di-2-ethylhexanoate (3GO)

(Styrenic Compound)

SX-100 (styrene oligomer, available from YASUHARA CHEMICAL CO., LTD. "YS resin SX100", tackifier and light absorber)

(Polymerization Inhibitor)

Hydroquinone (available from Wako Pure Chemical Industries, Ltd.)

As a lamp for emitting an active energy ray, the following lamp was prepared.

Chemical lamp (maximum wavelength $\lambda_{UV}$ 350 nm, "FL20S•BL 20W" available from TOSHIBA CORPORATION)

365 nm LED (maximum wavelength $\lambda_{UV}$ 365 nm)

380 nm LED (maximum wavelength $\lambda_{UV}$ 380 nm)

Example 1

<Preparation of Composition for Forming First Layer>

Preparation of Polymerizable Composition:

Components shown in Table 1 were mixed in mixing amounts shown in Table 1 to prepare a polymerizable composition.

Preparation of Cured Product:

The obtained polymerizable composition was sandwiched between two PET sheets having subjected to a mold release treatment on one side (available from Nippa Corporation, having a thickness of 50 μm) to form a polymerizable composition layer having a thickness of 100 μm. A spacer was arranged on the periphery of the two PET sheets. The polymerizable composition layer was irradiated with ultraviolet rays at an irradiation energy of 2000 mJ/cm² with a high pressure mercury UV lamp to cure the polymerizable composition by reaction. Then the two PET sheets having subjected to a mold release treatment on one side were peeled off. In this manner, a cured product (cured product layer) was obtained.

The obtained cured product layer was ground to obtain a composition for forming a first layer.

<Preparation of Composition for Forming Second Layer and Third Layer>

The following components were mixed, and kneaded sufficiently with a mixing roll to obtain a composition for forming a second layer and a third layer.

Polyvinyl acetal resin (PVB) 100 parts by weight

Triethylene glycol di-2-ethylhexanoate. (3GO) 30 parts by weight

Metal salt M (Mg mixture) in such an amount that is 70 ppm in the obtained second layer and third layers Ultraviolet ray screening agent (Tinuvin 326) in an amount of 0.2% by weight in the obtained second layer and third layers Oxidation inhibitor (BHT) in an amount of 0.2% by weight in the obtained second layer and third layers
<Preparation of Interlayer Film>
By coextruding the composition for forming a first layer and a composition for forming a second layer and a third layer using a coextruder, a multilayer interlayer film (800 μm in thickness) having a laminate structure of a second layer (350 μm in thickness)/a first layer (100 μm in thickness)/a third layer (350 μm in thickness) was prepared.
<Preparation of Laminated Glass (for Foaming Test)>
The obtained multilayer interlayer film was cut into a size of 30 cm in length×15 cm in width, and stored in an environment at a temperature of 23° C. for 10 hours. Both faces of the obtained multilayer interlayer film are embossed, and the 10-point average roughness of the embossing was 30 μm. In the cut multilayer interlayer film, through-holes having a diameter of 6 mm were formed at four intersections of the positions at 8 cm from the ends of the multilayer interlayer film inwardly in the longitudinal direction, and the positions at 5 cm from the ends of the multilayer interlayer film inwardly in the traverse direction to obtain a multilayer interlayer film having through-holes.

This multilayer interlayer film having through-holes was sandwiched between two sheets of transparent float glass (30 cm in length×15 cm in width×2.5 mm in thickness) to obtain a laminate. By sealing the periphery of the laminate by sealing the width of 2 cm from the end part by heat seal, the air remaining in the embossing and the air remaining in through-holes was contained. By press-bonding the laminate at 135° C. under a pressure of 1.2 MPa for 20 minutes, the remaining air was melted in the multilayer interlayer film, and thus a laminated glass for use in a foaming test was obtained.

Examples 2 to 31, 33 to 38 and Comparative Examples 1 to 9

<Preparation of Composition for Forming First Layer>
Preparation of Polymerizable Composition:
A polymerizable composition was obtained in the same manner as that in Example 1 except that components of the polymerizable composition and mixing amounts were changed as shown in Tables 1 to 6.
Preparation of Cured Product:
A cured product (cured product layer) was prepared in the same manner as that in Example 1 except that the thickness of the polymerizable composition layer, and the type of the lamp for emitting an active energy ray were changed as shown in Tables 1 to 5.
<Preparation of Interlayer Film>
A multilayer interlayer film (800 μm thick) having a laminate structure of the second layer (350 μm thick)/the first layer (100 μm thick)/the third layer (350 μm thick) was prepared in the same manner as that in Example 1.
<Preparation of Laminated Glass (for Foaming Test)>
A laminated glass was prepared in the same manner as that in Example 1.

Example 32

<Preparation of Composition for Forming First Layer>
Preparation of Polymerizable Composition:
A polymerizable composition was obtained in the same manner as that in Example 1 except that components of the polymerizable composition and mixing amounts were changed as shown in Table 4.
Preparation of Cured Product:
The obtained polymerizable composition was sandwiched between two PET sheets having subjected to a mold release treatment on one side (available from Nippa Corporation, having a thickness of 50 μm) to form a polymerizable composition layer having a thickness of 100 μm. A spacer was arranged on the periphery of the two PET sheets. On soda glass, the polymerizable composition layer was irradiated with ultraviolet rays at a dose of 2000 mJ/cm² with a high pressure mercury UV lamp to cure the polymerizable composition by reaction. Then the two PET sheets having subjected to a mold release treatment on one side were peeled off. In this manner, a cured product (cured product layer) was obtained.
<Preparation of Interlayer Film>
A multilayer interlayer film (800 μm thick) having a laminate structure of the second layer (350 μm thick)/the first layer (100 μm thick)/the third layer (350 μm thick) was prepared in the same manner as that in Example 1.
<Preparation of Laminated Glass (for Foaming Test)>
A laminated glass was prepared in the same manner as that in Example 1.
(Evaluation)
(1) Weight Average Molecular Weight and Molecular Weight Distribution Ratio of Thermoplastic (Meth)Acrylic Polymer
For Examples 1 to 32 and Comparative Examples 1 to 9, the obtained cured product was dissolved in tetrahydrofuran (THF) to prepare a solution of 0.2% by weight, and the solution was filtered through a filter of 0.2 μm. Using this solution, a weight average molecular weight and a number average molecular weight of the thermoplastic (meth)acrylic polymer on the polystyrene equivalent basis were measured by gel permeation chromatography (GPC) measurement in the above-described measurement condition. As an eluent, tetrahydrofuran (THF) was used. Also, on the basis of the obtained weight average molecular weight and number average molecular weight, a molecular weight distribution ratio (weight average molecular weight/number average molecular weight) of the thermoplastic (meth)acrylic polymer was calculated.

For Examples 33 to 38, the obtained cured product was dissolved in a 4:1 (weight ratio) mixture of dimethylformamide (DMF) and tetrahydrofuran (THF) to prepare a solution of 0.2% by weight, and the solution was filtered through a filter of 0.2 μm. Using this solution, a weight average molecular weight and a number average molecular weight of the thermoplastic (meth)acrylic polymer on the polystyrene equivalent basis were measured by gel permeation chromatography (GPC) measurement in the above-described measurement condition. As an eluent, a 10 mM solution of lithium bromide in a 4:1 (weight ratio) mixture of dimethylformamide (DMF) and tetrahydrofuran (THF) was used. Also, on the basis of the obtained weight average molecular weight and number average molecular weight, a molecular weight distribution ratio (weight average molecular weight/number average molecular weight) of the thermoplastic (meth)acrylic polymer was calculated.
(2) Gel Fraction of Thermoplastic (Meth)Acrylic Polymer
A thermoplastic (meth)acrylic polymer (0.15 g) was immersed in 30 g of tetrahydrofuran, and shaken and immersed at 23° C. for 36 hours. Then, the thermoplastic (meth)acrylic polymer was taken out through the filter of 200 meshes, and dried by heating at 110° C. for 1 hour. Then, the weight of the thermoplastic (meth)acrylic polymer was measured. A gel fraction was calculated by the following formula (X).

$$\text{Gel fraction (\% by weight)} = W2/W1 \times 100 \quad \text{Formula (X)}$$

W1: weight of thermoplastic (meth)acrylic polymer before immersing thermoplastic (meth)acrylic polymer in tetrahydrofuran at 23° C.

W2: weight of thermoplastic (meth)acrylic polymer after taking out and drying thermoplastic (meth)acrylic polymer immersed in tetrahydrofuran at 23° C.

(3) Content of (Meth)Acrylic Monomer

The obtained cured product (7 mg) or the obtained first layer (7 mg) was sampled on a platinum pan. The temperature of the sample was elevated at 5° C./min from 40° C. to 170° C. using a TG/DTA, then kept at 170° C. for 20 minutes, and subsequently the temperature of the sample was elevated at 5° C./min to 1000° C. and measurement was conducted. Among the obtained results, taking the result after 46 minutes from the start as a weight decrement, the content of the (meth)acrylic monomer in 100% by weight of the cured product, and the content of the (meth)acrylic monomer in 100% by weight of the first layer were determined.

(4) Peak Temperature of Tan δ of Cured Product Layer

The obtained polymerizable composition was cured by irradiating with light having an irradiation energy of 2000 mJ/cm$^2$ using the lamp for emitting an active energy ray used in each Example and each Comparative Example to obtain a cured product (cured product layer) having a thickness of 0.8 mm. Directly after storage of the obtained cured product layer in the environment of a room temperature of 23±2° C. and a humidity of 25±5% for 12 hours, viscoelasticity was measured by using a dynamic viscoelasticity measuring apparatus ("DVA-200" available from IT Keisoku Seigyo Company), and a peak temperature of tan δ of the cured product layer was determined. The measurement was conducted in the condition of raising the temperature from −50° C. to 200° C. at a temperature rising speed of 3° C./minute in a shearing mode, and in the condition of a frequency of 1 Hz and a strain of 1%.

(5) Maximum Temperature of Surface of Polymerizable Composition Layer at the Time of Curing The obtained polymerizable composition was sandwiched between two PET sheets having subjected to a mold release treatment on one side (available from Nippa Corporation, having a thickness of 50 μm) to form a polymerizable composition layer having a thickness of 3 mm. A spacer was arranged on the periphery of the two PET sheets. The polymerizable composition layer was cured by irradiating with light having an irradiation energy of 350 mJ/cm$^2$ using the lamp for emitting an active energy ray used in each Example and each Comparative Example. The maximum temperature of the surface of the polymerizable composition layer at the time of curing was measured by using a radiation thermometer ("IR-303" available from CUSTOM corporation).

(6) Pour Stability at the Time of Extrusion (Melting Viscosity)

In a mold, a die with an extrusion diameter of 1 mm and a tube length of 30 mm was inserted. After putting 40 g of the obtained product into a mold set at 200° C., the piston speed was adjusted to achieve a predetermined shear rate, and extrusion molding was carried out. Using a "CAPILOGRAPH 1B" available from Toyo Seiki Seisaku-sho, Ltd., melting viscosity (A) at which the load of each speed at the time of extrusion was constant was measured. The obtained melting viscosity (A) was extrapolated to a shearing stress curve of a formula: $\eta = \eta_0 \gamma^{n-1}$ ($\eta_0$: viscosity at the time of shear rate of 1, n: power law index), and viscosity at a shear rate of 1 was defined as melting viscosity (B). Pour stability at the time of extrusion was determined according to the following criteria for determination.

[Criteria for Determining Pour Stability (Melting Viscosity) at the Time of Extrusion]

○○: Melting viscosity (B) is 7000 Pa·s or less.

○: Melting viscosity (B) is more than 7000 Pa·s and 15000 Pa·s or less

Δ: Melting viscosity (B) is more than 15000 Pa·s and 40000 Pa·s or less x: Melting viscosity (B) is more than 40000 Pa·s xx: Melting viscosity (A) is unmeasurable (no fluidity or constant load is not achieved)

(7) Foaming State in Laminated Glass

Ten sheets of laminated glass were left to stand in an oven at 50° C. for 100 hours. In the laminated glass after standing, whether foaming occurs was visually observed in a plan view. On the basis of the observation result, the state of foaming was determined according to the following criteria for determination.

Criteria for determining foaming state in laminated glass

○: Foaming was observed in 0 of 10 sheets of laminated glass

Δ: Foaming was observed in 1 or more and 9 or less of 10 sheets of laminated glass ΔΔ: Foaming was observed in 10 of 10 sheets of laminated glass (provided that maximum diameter of foams in 10 sheets is less than 100 μm)

X: Foaming was observed in 10 of 10 sheets of laminated glass (provided that maximum diameter of foams in 10 sheets is 100 μm or more)

(8) Creases in Cured Product

Two internal mold release PET films were prepared. The obtained polymerizable composition was applied on one of the PET films into a size of 500 mm in length×300 mm in width×3 mm in thickness, and then the other of the PET films was layered to obtain a laminate (1) (PET film/polymerizable composition/PET film). On a specular soda glass, the polymerizable composition was cured by irradiation with light having an irradiation energy of 2000 mJ/cm$^2$ using a chemical lamp, and thus a laminate (2) (PET film/cured product/PET film) was obtained. An absolute value of variation in thickness between the laminate (1) and the laminate (2) was calculated, and in the laminate (2), the presence or absence of delamination between the cured product and the PET film was observed.

[Criteria for Determining Creases in Cured Product]

○○: The absolute value of variation in thickness is 57, or less, and delamination between cured product and PET film is not observed ○: The absolute value of variation in thickness is more than 5% and 15% or less, and delamination between cured product and PET film is not observed Δ: The absolute value of variation in thickness is more than 15% and 30% or less, and in an end part of the PET film, the cured product and the PET film delaminate over 20 mm or less.

ΔΔ: The absolute value of variation in thickness is more than 30%, and in an end part of the PET film, the cured product and the PET film delaminate over 20 mm or more and 100 mm or less.

X: The absolute value of variation in thickness is more than 30%, and in an end part of the PET film, the cured product and the PET film delaminate over 100 mm or more.

(9) Curing Performance of Polymerizable Composition

Two internal mold release PET films were prepared. The obtained polymerizable composition was applied on one of the PET films into a size of 200 mm in length×200 mm in width×3 mm in thickness, and then the other of the PET films was layered to obtain a laminate (1) (PET film/ polymerizable composition/PET film). On a specular soda glass, the polymerizable composition was cured by irradiation with light having an irradiation energy of 2000 mJ/cm² using a chemical lamp, and thus a laminate (2) (PET film/cured product/PET film) was obtained. In the laminate (2), one of the PET films was peeled off. In a region of 3 mm or more internally from the surface on which the polymerizable composition was applied in the peeled off PET film, whether the cured product adhered was observed.

[Criteria for Determining Curing Performance of Polymerizable Composition]

◯: Cured product adheres to PET film in size of less than 3 mm, or no cured product adheres to PET film X: Cured product adheres to PET film in size of 3 mm or more The details and the results are shown in the following Tables 1 to 12.

TABLE 1

| | | | | Example 1 | Example 2 | Example 3 |
|---|---|---|---|---|---|---|
| Components of polymerizable composition | (Meth)acrylic monomer | MEDOL10 | parts by weight | 10 | 10 | 10 |
| | | IBOA | parts by weight | 70 | 70 | 70 |
| | | CTFA | parts by weight | 20 | 20 | 20 |
| | | 4-hydroxybutyl acrylate | parts by weight | — | — | — |
| | | Acrylic acid | parts by weight | — | — | — |
| | Photopolymerization initiator | Irg. 184 | parts by weight | 0.2 | 0.2 | 0.2 |
| | Ultraviolet absorber | Tinuvin326 | parts by weight | — | — | — |
| | | Tinuvin400 | parts by weight | — | — | — |
| | | Tinuvin460 | parts by weight | — | — | — |
| | | PR-25 | parts by weight | — | — | — |
| | | Benzophenone | parts by weight | — | — | — |
| | Plasticizer | 3GO | parts by weight | — | — | — |
| | Styrenic compound | SX-100 | parts by weight | — | — | — |
| | Polymerization inhibitor | Hydroquinone | parts by weight | — | — | — |
| Thickness of polymerizable composition layer | | | | 100 μm | 530 μm | 1 mm |
| Active energy ray | Type of lamp | | — | Chemical lamp | Chemical lamp | Chemical lamp |
| | Irradiation energy | | mJ/cm² | 2000 | 2000 | 2000 |
| | Maximum wavelength $\lambda_{JV}$ | | nm | 350 | 350 | 350 |
| Wavelength evaluation | Photopolymerization initiator | Maximum absorption wavelength $\lambda_1$ in wavelengths of 300 nm or more | nm | 326 | 326 | 326 |
| | Ultraviolet absorber | Maximum absorbance A in wavelengths of 280 nm or more | — | — | — | — |
| | | Wavelength at which absorbance is maximum | nm | — | — | — |
| | | Wavelength $\lambda_2$ satisfying A/4 and being larger than $\lambda_1$ | nm | — | — | — |
| | $\lambda_{JV} - \lambda_1$ | | nm | 24 | 24 | 24 |
| | $\lambda_2 - \lambda_1$ | | nm | — | — | — |

| | | | | Example 4 | Example 5 | Example 6 |
|---|---|---|---|---|---|---|
| Components of polymerizable composition | (Meth)acrylic monomer | MEDOL10 | parts by weight | 10 | 10 | 10 |
| | | IBOA | parts by weight | 70 | 70 | 70 |
| | | CTFA | parts by weight | 20 | 20 | 20 |
| | | 4-hydroxybutyl acrylate | parts by weight | — | — | — |
| | | Acrylic acid | parts by weight | — | — | — |
| | Photopolymerization initiator | Irg. 184 | parts by weight | 0.2 | 0.2 | 0.2 |
| | Ultraviolet absorber | Tinuvin326 | parts by weight | — | — | — |
| | | Tinuvin400 | parts by weight | — | — | — |

TABLE 1-continued

| | | | | | | |
|---|---|---|---|---|---|---|
| | | Tinuvin460 | parts by weight | — | — | — |
| | | PR-25 | parts by weight | 0.1 | 0.1 | — |
| | | Benzophenone | parts by weight | — | — | — |
| | Plasticizer | 3GO | parts by weight | — | — | — |
| | Styrenic compound | SX-100 | parts by weight | — | — | — |
| | Polymerization inhibitor | Hydroquinone | parts by weight | — | — | — |
| Thickness of polymerizable composition layer | | | | 2 mm | 2 mm | 2 mm |
| Active energy ray | | Type of lamp | — | Chemical lamp | 365 nm LED | 380 nm LED |
| | | Irradiation energy | mJ/cm$^2$ | 2000 | 2000 | 2000 |
| | | Maximum wavelength $\lambda_{JV}$ | nm | 350 | 365 | 380 |
| Wavelength evaluation | Photopolymerization initiator | Maximum absorption wavelength $\lambda_1$ in wavelengths of 300 nm or more | nm | 326 | 326 | 326 |
| | Ultraviolet absorber | Maximum absorbance A in wavelengths of 280 nm or more | — | 34.738 | 34.738 | — |
| | | Wavelength at which absorbance is maximum | nm | 317 | 317 | — |
| | | Wavelength $\lambda_2$ satisfying A/4 and being larger than $\lambda_1$ | nm | 339 | 339 | — |
| | $\lambda_{JV} - \lambda_1$ | | nm | 24 | 39 | 54 |
| | $\lambda_2 - \lambda_1$ | | nm | 13 | 13 | — |

| | | | | Example 7 | Example 8 | Example 9 |
|---|---|---|---|---|---|---|
| Components of polymerizable composition | (Meth)acrylic monomer | MEDOL10 | parts by weight | 10 | 10 | 10 |
| | | IBOA | parts by weight | 70 | 70 | 70 |
| | | CTFA | parts by weight | 20 | 20 | 20 |
| | | 4-hydroxybutyl acrylate | parts by weight | — | — | — |
| | | Acrylic acid | parts by weight | — | — | — |
| | Photopolymerization initiator | Irg. 184 | parts by weight | 0.2 | 0.2 | 0.2 |
| | Ultraviolet absorber | Tinuvin326 | parts by weight | — | — | — |
| | | Tinuvin400 | parts by weight | — | 0.01 | 0.075 |
| | | Tinuvin460 | parts by weight | — | — | — |
| | | PR-25 | parts by weight | — | — | — |
| | | Benzophenone | parts by weight | — | — | — |
| | Plasticizer | 3GO | parts by weight | — | — | — |
| | Styrenic compound | SX-100 | parts by weight | — | — | — |
| | Polymerization inhibitor | Hydroquinone | parts by weight | — | — | — |
| Thickness of polymerizable composition layer | | | | 3 mm | 3 mm | 3 mm |
| Active energy ray | | Type of lamp | — | 380 nm LED | Chemical lamp | Chemical lamp |
| | | Irradiation energy | mJ/cm$^2$ | 2000 | 2000 | 2000 |
| | | Maximum wavelength $\lambda_{JV}$ | nm | 380 | 350 | 350 |
| Wavelength evaluation | Photopolymerization initiator | Maximum absorption wavelength $\lambda_1$ in wavelengths of 300 nm or more | nm | 326 | 326 | 326 |
| | Ultraviolet absorber | Maximum absorbance A in wavelengths of 280 nm or more | — | — | 13.069 | 13.069 |
| | | Wavelength at which absorbance is maximum | nm | — | 333 | 333 |
| | | Wavelength $\lambda_2$ satisfying A/4 and being larger than $\lambda_1$ | nm | — | 354 | 354 |
| | $\lambda_{JV} - \lambda_1$ | | nm | 54 | 24 | 24 |
| | $\lambda_2 - \lambda_1$ | | nm | — | 28 | 28 |

TABLE 2

| | | | | Example 10 | Example 11 | Example 12 |
|---|---|---|---|---|---|---|
| Components of polymerizable composition | (Meth)acrylic monomer | MEDOL10 | parts by weight | 10 | 10 | 10 |
| | | IBOA | parts by weight | 70 | 70 | 70 |
| | | CTFA | parts by weight | 20 | 20 | 20 |
| | | 4-hydroxybutyl acrylate | parts by weight | — | — | — |
| | | Acrylic acid | parts by weight | — | — | — |
| | Photopolymerization initiator | Irg. 184 | parts by weight | 0.2 | 0.2 | 0.2 |
| | Ultraviolet absorber | Tinuvin326 | parts by weight | 0.005 | 0.0033 | — |
| | | Tinuvin400 | parts by weight | — | — | — |
| | | Tinuvin460 | parts by weight | — | — | 0.002 |
| | | PR-25 | parts by weight | — | — | — |
| | | Benzophenone | parts by weight | — | — | — |
| | Plasticizer | 3GO | parts by weight | — | — | — |
| | Styrenic compound | SX-100 | parts by weight | — | — | — |
| | Polymerization inhibitor | Hydroquinone | parts by weight | — | — | — |
| Thickness of polymerizable composition layer | | | | 3 mm | 3 mm | 3 mm |
| Active energy ray | | Type of lamp | — | Chemical lamp | Chemical lamp | Chemical lamp |
| | | Irradiation energy | mJ/cm$^2$ | 2000 | 2000 | 2000 |
| | | Maximum wavelength $\lambda_{UV}$ | nm | 350 | 350 | 350 |
| Wavelength evaluation | Photopolymerization initiator | Maximum absorption wavelength $\lambda_1$ in wavelengths of 300 nm or more | nm | 326 | 326 | 326 |
| | Ultraviolet absorber | Maximum absorbance A in wavelengths of 280 nm or more | — | 20.988 | 20.988 | 36.357 |
| | | Wavelength at which absorbance is maximum | nm | 348 | 348 | 340 |
| | | Wavelength $\lambda_2$ satisfying A/4 and being larger than $\lambda_1$ | nm | 384 | 384 | 371 |
| | $\lambda_{UV} - \lambda_1$ | | nm | 24 | 24 | 24 |
| | $\lambda_2 - \lambda_1$ | | nm | 58 | 58 | 45 |

| | | | | Example 13 | Example 14 | Example 15 |
|---|---|---|---|---|---|---|
| Components of polymerizable composition | (Meth)acrylic monomer | MEDOL10 | parts by weight | 10 | 10 | — |
| | | IBOA | parts by weight | 70 | 70 | 70 |
| | | CTFA | parts by weight | 20 | 20 | 20 |
| | | 4-hydroxybutyl acrylate | parts by weight | — | — | 10 |
| | | Acrylic acid | parts by weight | — | — | — |
| | Photopolymerization initiator | Irg. 184 | parts by weight | 0.2 | 0.2 | 0.2 |
| | Ultraviolet absorber | Tinuvin326 | parts by weight | — | — | — |
| | | Tinuvin400 | parts by weight | — | — | — |
| | | Tinuvin460 | parts by weight | — | — | — |
| | | PR-25 | parts by weight | 0.005 | 0.1 | 0.1 |
| | | Benzophenone | parts by weight | — | — | — |
| | Plasticizer | 3GO | parts by weight | — | — | — |
| | Styrenic compound | SX-100 | parts by weight | — | — | — |
| | Polymerization inhibitor | Hydroquinone | parts by weight | — | — | — |
| Thickness of polymerizable composition layer | | | | 3 mm | 3 mm | 3 mm |
| Active energy ray | | Type of lamp | — | Chemical lamp | Chemical lamp | Chemical lamp |

TABLE 2-continued

|  |  |  |  |  |  |  |
|---|---|---|---|---|---|---|
| Wavelength evaluation | Photopolymerization initiator | Irradiation energy | mJ/cm² | 2000 | 2000 | 2000 |
|  |  | Maximum wavelength $\lambda_{JV}$ | nm | 350 | 350 | 350 |
|  |  | Maximum absorption wavelength $\lambda_1$ in wavelengths of 300 nm or more | nm | 326 | 326 | 326 |
|  | Ultraviolet absorber | Maximum absorbance A in wavelengths of 280 nm or more | — | 34.738 | 34.738 | 34.738 |
|  |  | Wavelength at which absorbance is maximum | nm | 317 | 317 | 317 |
|  |  | Wavelength $\lambda_2$ satisfying A/4 and being larger than $\lambda_1$ | nm | 339 | 339 | 339 |
|  | $\lambda_{JV} - \lambda_1$ |  | nm | 24 | 24 | 24 |
|  | $\lambda_2 - \lambda_1$ |  | nm | 13 | 13 | 13 |

|  |  |  |  | Example 16 | Example 17 | Example 18 |
|---|---|---|---|---|---|---|
| Components of polymerizable composition | (Meth)acrylic monomer | MEDOL10 | parts by weight | — | 10 | 10 |
|  |  | IBOA | parts by weight | 65 | 70 | 70 |
|  |  | CTFA | parts by weight | 30 | 20 | 20 |
|  |  | 4-hydroxybutyl acrylate | parts by weight | — | — | — |
|  |  | Acrylic acid | parts by weight | 5 | — | — |
|  | Photopolymerization initiator | Irg. 184 | parts by weight | 0.2 | 0.2 | 0.2 |
|  | Ultraviolet absorber | Tinuvin326 | parts by weight | — | — | — |
|  |  | Tinuvin400 | parts by weight | — | — | — |
|  |  | Tinuvin460 | parts by weight | — | — | — |
|  |  | PR-25 | parts by weight | 0.1 | 0.05 | 0.0075 |
|  |  | Benzophenone | parts by weight | — | — | — |
|  | Plasticizer | 3GO | parts by weight | — | — | — |
|  | Styrenic compound | SX-100 | parts by weight | — | — | — |
|  | Polymerization inhibitor | Hydroquinone | parts by weight | — | — | — |
| Thickness of polymerizable composition layer |  |  |  | 3 mm | 3 mm | 3 mm |
| Active energy ray | Type of lamp |  | — | Chemical lamp | Chemical lamp | Chemical lamp |
|  | Irradiation energy |  | mJ/cm² | 2000 | 2000 | 2000 |
|  | Maximum wavelength $\lambda_{JV}$ |  | nm | 350 | 350 | 350 |
| Wavelength evaluation | Photopolymerization initiator | Maximum absorption wavelength $\lambda_1$ in wavelengths of 300 nm or more | nm | 326 | 326 | 326 |
|  | Ultraviolet absorber | Maximum absorbance A in wavelengths of 280 nm or more | — | 34.738 | 34.738 | 34.738 |
|  |  | Wavelength at which absorbance is maximum | nm | 317 | 317 | 317 |
|  |  | Wavelength $\lambda_2$ satisfying A/4 and being larger than $\lambda_1$ | nm | 339 | 339 | 339 |
|  | $\lambda_{JV} - \lambda_1$ |  | nm | 24 | 24 | 24 |
|  | $\lambda_2 - \lambda_1$ |  | nm | 13 | 13 | 13 |

TABLE 3

|  |  |  |  | Example 19 | Example 20 | Example 21 |
|---|---|---|---|---|---|---|
| Components of polymerizable composition | (Meth)acrylic monomer | MEDOL10 | parts by weight | 10 | 10 | 10 |
|  |  | IBOA | parts by weight | 70 | 70 | 70 |
|  |  | CTFA | parts by weight | 20 | 20 | 20 |
|  |  | 4-hydroxybutyl acrylate | parts by weight | — | — | — |
|  |  | Acrylic acid | parts by weight | — | — | — |
|  | Photopolymerization initiator | Irg. 184 | parts by weight | 0.2 | 0.2 | 0.2 |
|  | Ultraviolet absorber | Tinuvin326 | parts by weight | — | — | — |

TABLE 3-continued

| | | | | | | |
|---|---|---|---|---|---|---|
| | | Tinuvin400 | parts by weight | — | — | — |
| | | Tinuvin460 | parts by weight | — | — | — |
| | | PR-25 | parts by weight | 0.1 | 0.1 | 0.1 |
| | | Benzophenone | parts by weight | — | — | — |
| | Plasticizer | 3GO | parts by weight | — | — | — |
| | Styrenic compound | SX-100 | parts by weight | — | — | — |
| | Polymerization inhibitor | Hydroquinone | parts by weight | — | — | — |
| Thickness of polymerizable composition layer | | | | 3 mm | 3 mm | 3 mm |
| Active energy ray | | Type of lamp | — | Chemical lamp | Chemical lamp | Chemical lamp |
| | | Irradiation energy | mJ/cm$^2$ | 1000 | 1000 | 2000 |
| | | Maximum wavelength $\lambda_{JV}$ | nm | 350 | 350 | 350 |
| Wavelength evaluation | Photopolymerization initiator | Maximum absorption wavelength $\lambda_1$ in wavelengths of 300 nm or more | nm | 326 | 326 | 326 |
| | Ultraviolet absorber | Maximum absorbance A in wavelengths of 280 nm or more | — | 34.738 | 34.738 | 34.738 |
| | | Wavelength at which absorbance is maximum | nm | 317 | 317 | 317 |
| | | Wavelength $\lambda_2$ satisfying A/4 and being larger than $\lambda_1$ | nm | 339 | 339 | 339 |
| | $\lambda_{JV} - \lambda_1$ | | nm | 24 | 24 | 24 |
| | $\lambda_2 - \lambda_1$ | | nm | 13 | 13 | 13 |

| | | | | Example 22 | Example 23 | Example 24 |
|---|---|---|---|---|---|---|
| Components of polymerizable composition | (Meth)acrylic monomer | MEDOL10 | parts by weight | 10 | 10 | 10 |
| | | IBOA | parts by weight | 70 | 70 | 70 |
| | | CTFA | parts by weight | 20 | 20 | 20 |
| | | 4-hydroxybutyl acrylate | parts by weight | — | — | — |
| | | Acrylic acid | parts by weight | — | — | — |
| | Photopolymerization initiator | Irg. 184 | parts by weight | 0.2 | 0.2 | 0.2 |
| | Ultraviolet absorber | Tinuvin326 | parts by weight | — | — | — |
| | | Tinuvin400 | parts by weight | — | — | — |
| | | Tinuvin460 | parts by weight | — | — | — |
| | | PR-25 | parts by weight | 0.1 | 0.1 | 0.1 |
| | | Benzophenone | parts by weight | — | — | — |
| | Plasticizer | 3GO | parts by weight | — | — | — |
| | Styrenic compound | SX-100 | parts by weight | — | — | — |
| | Polymerization inhibitor | Hydroquinone | parts by weight | — | — | — |
| Thickness of polymerizable composition layer | | | | 1 mm | 500 μm | 100 μm |
| Active energy ray | | Type of lamp | — | Chemical lamp | Chemical lamp | Chemical lamp |
| | | Irradiation energy | mJ/cm$^2$ | 2000 | 2000 | 2000 |
| | | Maximum wavelength $\lambda_{JV}$ | nm | 350 | 350 | 350 |
| Wavelength evaluation | Photopolymerization initiator | Maximum absorption wavelength $\lambda_1$ in wavelengths of 300 nm or more | nm | 326 | 326 | 326 |
| | Ultraviolet absorber | Maximum absorbance A in wavelengths of 280 nm or more | — | 34.738 | 34.738 | 34.738 |
| | | Wavelength at which absorbance is maximum | nm | 317 | 317 | 317 |
| | | Wavelength $\lambda_2$ satisfying A/4 and being larger than $\lambda_1$ | nm | 339 | 339 | 339 |
| | $\lambda_{JV} - \lambda_1$ | | nm | 24 | 24 | 24 |
| | $\lambda_2 - \lambda_1$ | | nm | 13 | 13 | 13 |

TABLE 3-continued

|  |  |  |  | Example 25 | Example 26 | Example 27 |
|---|---|---|---|---|---|---|
| Components of polymerizable composition | (Meth)acrylic monomer | MEDOL10 | parts by weight | 10 | 10 | 10 |
|  |  | IBOA | parts by weight | 70 | 70 | 70 |
|  |  | CTFA | parts by weight | 20 | 20 | 20 |
|  |  | 4-hydroxybutyl acrylate | parts by weight | — | — | — |
|  |  | Acrylic acid | parts by weight | — | — | — |
|  | Photopolymerization initiator | Irg. 184 | parts by weight | 0.2 | 0.2 | 0.2 |
|  | Ultraviolet absorber | Tinuvin326 | parts by weight | — | — | — |
|  |  | Tinuvin400 | parts by weight | — | — | — |
|  |  | Tinuvin460 | parts by weight | — | — | — |
|  |  | PR-25 | parts by weight | — | — | — |
|  |  | Benzophenone | parts by weight | — | — | — |
|  | Plasticizer | 3GO | parts by weight | 20 | — | — |
|  | Styrenic compound | SX-100 | parts by weight | — | 20 | — |
|  | Polymerization inhibitor | Hydroquinone | parts by weight | — | — | 1 |
| Thickness of polymerizable composition layer |  |  |  | 3 mm | 3 mm | 3 mm |
| Active energy ray |  | Type of lamp | — | Chemical lamp | Chemical lamp | Chemical lamp |
|  |  | Irradiation energy | mJ/cm$^2$ | 2000 | 2000 | 2000 |
|  |  | Maximum wavelength $\lambda_{JV}$ | nm | 350 | 350 | 350 |
| Wavelength evaluation | Photopolymerization initiator | Maximum absorption wavelength $\lambda_1$ in wavelengths of 300 nm or more | nm | 326 | 326 | 326 |
|  | Ultraviolet absorber | Maximum absorbance A in wavelengths of 280 nm or more | — | — | — | — |
|  |  | Wavelength at which absorbance is maximum | nm | — | — | — |
|  |  | Wavelength $\lambda_2$ satisfying A/4 and being larger than $\lambda_1$ | nm | — | — | — |
|  |  | $\lambda_{JV} - \lambda_1$ | nm | 24 | 24 | 24 |
|  |  | $\lambda_2 - \lambda_1$ | nm | — | — | — |

TABLE 4

|  |  |  |  | Example 28 | Example 29 | Example 30 |
|---|---|---|---|---|---|---|
| Components of polymerizable composition | (Meth)acrylic monomer | MEDOL10 | parts by weight | 10 | 10 | 10 |
|  |  | IBOA | parts by weight | 70 | 70 | 70 |
|  |  | CTFA | parts by weight | 20 | 20 | 20 |
|  |  | 4-hydroxybutyl acrylate | parts by weight | — | — | — |
|  |  | Acrylic acid | parts by weight | — | — | — |
|  | Photopolymerization initiator | Irg. 184 | parts by weight | 0.2 | 0.2 | 0.1 |
|  | Ultraviolet absorber | Tinuvin326 | parts by weight | — | — | — |
|  |  | Tinuvin400 | parts by weight | — | — | — |
|  |  | Tinuvin460 | parts by weight | — | — | — |
|  |  | PR-25 | parts by weight | — | — | — |
|  |  | Benzophenone | parts by weight | — | — | — |
|  | Plasticizer | 3GO | parts by weight | — | — | — |
|  | Styrenic compound | SX-100 | parts by weight | — | — | — |

TABLE 4-continued

| | | | | | | |
|---|---|---|---|---|---|---|
| | Polymerization inhibitor | Hydroquinone | parts by weight | — | 0.001 | — |
| Thickness of polymerizable composition layer | | | | 3 mm | 3 mm | 3 mm |
| Active energy ray | | Type of lamp | — | Chemical lamp | Chemical lamp | Chemical lamp |
| | | Irradiation energy | mJ/cm$^2$ | 2000 | 2000 | 2000 |
| | | Maximum wavelength $\lambda_{JV}$ | nm | 350 | 350 | 350 |
| Wavelength evaluation | Photopolymerization initiator | Maximum absorption wavelength $\lambda_1$ in wavelengths of 300 nm or more | nm | 326 | 326 | 326 |
| | Ultraviolet absorber | Maximum absorbance A in wavelengths of 280 nm or more | — | — | — | — |
| | | Wavelength at which absorbance is maximum | nm | — | — | — |
| | | Wavelength $\lambda_2$ satisfying A/4 and being larger than $\lambda_1$ | nm | — | — | — |
| | $\lambda_{JV} - \lambda_1$ | | nm | 24 | 24 | 24 |
| | $\lambda_2 - \lambda_1$ | | nm | — | — | — |

| | | | | Example 31 | Example 32 |
|---|---|---|---|---|---|
| Components of polymerizable composition | (Meth)acrylic monomer | MEDOL10 | parts by weight | 10 | 10 |
| | | IBOA | parts by weight | 70 | 70 |
| | | CTFA | parts by weight | 20 | 20 |
| | | 4-hydroxybutyl acrylate | parts by weight | — | — |
| | | Acrylic acid | parts by weight | — | — |
| | Photopolymerization initiator | Irg. 184 | parts by weight | 0.15 | 0.2 |
| | Ultraviolet absorber | Tinuvin326 | parts by weight | 0.002 | — |
| | | Tinuvin400 | parts by weight | — | — |
| | | Tinuvin460 | parts by weight | — | — |
| | | PR-25 | parts by weight | — | — |
| | | Benzophenone | parts by weight | — | — |
| | Plasticizer | 3GO | parts by weight | — | — |
| | Styrenic compound | SX-100 | parts by weight | — | — |
| | Polymerization inhibitor | Hydroquinone | parts by weight | — | — |
| Thickness of polymerizable composition layer | | | | 3 mm | 3 mm |
| Active energy ray | | Type of lamp | — | Chemical lamp | Chemical lamp |
| | | Irradiation energy | mJ/cm$^2$ | 2000 | 2000 |
| | | Maximum wavelength $\lambda_{JV}$ | nm | 350 | 350 |
| Wavelength evaluation | Photopolymerization initiator | Maximum absorption wavelength $\lambda_1$ in wavelengths of 300 nm or more | nm | 326 | 326 |
| | Ultraviolet absorber | Maximum absorbance A in wavelengths of 280 nm or more | — | 20.988 | 33.056* |
| | | Wavelength at which absorbance is maximum | nm | 348 | 305* |
| | | Wavelength $\lambda_2$ satisfying A/4 and being larger than $\lambda_1$ | nm | 384 | 325* |
| | $\lambda_{JV} - \lambda_1$ | | nm | 24 | 24 |
| | $\lambda_2 - \lambda_1$ | | nm | 58 | −1 |

*Performance of soda glass

TABLE 5

| | | | | Example 33 | Example 34 | Example 35 |
|---|---|---|---|---|---|---|
| Components of polymerizable composition | (Meth)acrylic monomer | MEDOL10 | parts by weight | — | — | — |
| | | IBOA | parts by weight | 50 | 50 | 60 |
| | | CTFA | parts by weight | 10 | 20 | 5 |
| | | 4-hydroxybutyl acrylate | parts by weight | — | — | — |

TABLE 5-continued

|  |  |  |  |  |  |  |
|---|---|---|---|---|---|---|
|  |  | Acrylic acid | parts by weight | — | — | — |
|  |  | Dimethylacrylamide | parts by weight | 30 | 22 | 25 |
|  |  | Butyl acrylate | parts by weight | — | 8 | 10 |
|  |  | 2-ethylhexyl acrylate | parts by weight | — | — | — |
|  | Photopolymerization initiator | Irg. 184 | parts by weight | 0.2 | 0.2 | 0.2 |
|  | Ultraviolet absorber | Tinuvin326 | parts by weight | — | — | — |
|  |  | Tinuvin400 | parts by weight | — | — | — |
|  |  | Tinuvin460 | parts by weight | — | — | — |
|  |  | PR-25 | parts by weight | 0.2 | 0.2 | 0.2 |
|  |  | Benzophenone | parts by weight | — | — | — |
|  | Plasticizer | 3GO | parts by weight | 2.5 | — | — |
|  | Styrenic compound | SX-100 | parts by weight | — | — | — |
|  | Polymerization inhibitor | Hydroquinone | parts by weight | — | — | — |
|  | Other resin | Polyvinyl acetyl resin | parts by weight | — | — | — |
| Thickness of polymerizable composition layer |  |  |  | 3 mm | 3 mm | 3 mm |
| Active energy ray | Type of lamp |  | — | Chemical lamp | Chemical lamp | Chemical lamp |
|  | Irradiation energy |  | mJ/cm$^2$ | 3000 | 3000 | 3000 |
|  | Maximum wavelength $\lambda_{JV}$ |  | nm | 350 | 350 | 350 |
| Wavelength evaluation | Photopolymerization initiator | Maximum absorption wavelength $\lambda_1$ in wavelengths of 300 nm or more | nm | 326 | 326 | 326 |
|  | Ultraviolet absorber | Maximum absorbance A in wavelengths of 280 nm or more | — | 34.738 | 34.738 | 34.738 |
|  |  | Wavelength at which absorbance is maximum | nm | 317 | 317 | 317 |
|  |  | Wavelength $\lambda_2$ satisfying A/4 and being larger than $\lambda_1$ | nm | 339 | 339 | 339 |
|  | $\lambda_{JV} - \lambda_1$ |  | nm | 24 | 24 | 24 |
|  | $\lambda_2 - \lambda_1$ |  | nm | 13 | 13 | 13 |

|  |  |  |  | Example 36 | Example 37 | Example 38 |
|---|---|---|---|---|---|---|
| Components of polymerizable composition | (Meth)acrylic monomer | MEDOL10 | parts by weight | — | — | — |
|  |  | IBOA | parts by weight | 54 | 62.5 | 60 |
|  |  | CTFA | parts by weight | 25 | 10 | 5 |
|  |  | 4-hydroxybutyl acrylate | parts by weight | — | — | — |
|  |  | Acrylic acid | parts by weight | — | — | — |
|  |  | Dimethylacrylamide | parts by weight | 15 | 20 | 25 |
|  |  | Butyl acrylate | parts by weight | — | — | 10 |
|  |  | 2-ethylhexyl acrylate | parts by weight | 6 | 7.5 | — |
|  | Photopolymerization initiator | Irg. 184 | parts by weight | 0.2 | 0.2 | 0.2 |
|  | Ultraviolet absorber | Tinuvin326 | parts by weight | — | — | — |
|  |  | Tinuvin400 | parts by weight | — | — | — |
|  |  | Tinuvin460 | parts by weight | — | — | — |
|  |  | PR-25 | parts by weight | 0.2 | 0.2 | 0.2 |
|  |  | Benzophenone | parts by weight | — | — | — |
|  | Plasticizer | 3GO | parts by weight | — | — | — |
|  | Styrenic compound | SX-100 | parts by weight | — | — | — |
|  | Polymerization inhibitor | Hydroquinone | parts by weight | — | — | — |

TABLE 5-continued

|  |  |  |  |  |  |  |
|---|---|---|---|---|---|---|
| | Other resin | Polyvinyl acetyl resin | parts by weight | — | — | 8 |
| Thickness of polymerizable composition layer | | | | 3 mm | 3 mm | 3 mm |
| Active energy ray | | Type of lamp | — | Chemical lamp | Chemical lamp | Chemical lamp |
| | | Irradiation energy | mJ/cm$^2$ | 3000 | 3000 | 3000 |
| | | Maximum wavelength $\lambda_{JV}$ | nm | 350 | 350 | 350 |
| Wavelength evaluation | Photopolymerization initiator | Maximum absorption wavelength $\lambda_1$ in wavelengths of 300 nm or more | nm | 326 | 326 | 326 |
| | Ultraviolet absorber | Maximum absorbance A in wavelengths of 280 nm or more | — | 34.738 | 34.738 | 34.738 |
| | | Wavelength at which absorbance is maximum | nm | 317 | 317 | 317 |
| | | Wavelength $\lambda_2$ satisfying A/4 and being larger than $\lambda_1$ | nm | 339 | 339 | 339 |
| | $\lambda_{JV} - \lambda_1$ | | nm | 24 | 24 | 24 |
| | $\lambda_2 - \lambda_1$ | | nm | 13 | 13 | 13 |

TABLE 6

|  |  |  |  | Comparative Example 1 | Comparative Example 2 | Comparative Example 3 |
|---|---|---|---|---|---|---|
| Components of polymerizable composition | (Meth)acrylic monomer | MEDOL10 | parts by weight | 10 | 10 | 10 |
| | | IBOA | parts by weight | 70 | 70 | 70 |
| | | CTFA | parts by weight | 20 | 20 | 20 |
| | | 4-hydroxybutyl acrylate | parts by weight | — | — | — |
| | | Acrylic acid | parts by weight | — | — | — |
| | Photopolymerization initiator | Irg. 184 | parts by weight | 0.2 | 0.1 | 0.2 |
| | Ultraviolet absorber | Tinuvin326 | parts by weight | — | 0.002 | — |
| | | Tinuvin400 | parts by weight | — | — | 0.1 |
| | | Tinuvin460 | parts by weight | — | — | — |
| | | PR-25 | parts by weight | — | — | — |
| | | Benzophenone | parts by weight | — | — | — |
| | Plasticizer | 3GO | parts by weight | — | — | — |
| | Styrenic compound | SX-100 | parts by weight | — | — | — |
| | Polymerization inhibitor | Hydroquinone | parts by weight | 0.01 | — | — |
| Thickness of polymerizable composition layer | | | | 3 mm | 3 mm | 3 mm |
| Active energy ray | | Type of lamp | — | Chemical lamp | Chemical lamp | Chemical lamp |
| | | Irradiation energy | mJ/cm$^2$ | 2000 | 2000 | 2000 |
| | | Maximum wavelength $\lambda_{JV}$ | nm | 350 | 350 | 350 |
| Wavelength evaluation | Photopolymerization initiator | Maximum absorption wavelength $\lambda_1$ in wavelengths of 300 nm or more | nm | 326 | 326 | 326 |
| | Ultraviolet absorber | Maximum absorbance A in wavelengths of 280 nm or more | — | — | 20.988 | 20.988 |
| | | Wavelength at which absorbance is maximum | nm | — | 348 | 348 |
| | | Wavelength $\lambda_2$ satisfying A/4 and being larger than $\lambda_1$ | nm | — | 354 | 384 |
| | $\lambda_{JV} - \lambda_1$ | | nm | 24 | 24 | 24 |
| | $\lambda_2 - \lambda_1$ | | nm | — | 28 | 58 |

|  |  |  |  | Comparative Example 4 | Comparative Example 5 | Comparative Example 6 |
|---|---|---|---|---|---|---|
| Components of polymerizable composition | (Meth)acrylic monomer | MEDOL10 | parts by weight | 10 | 10 | 10 |
| | | IBOA | parts by weight | 70 | 70 | 70 |
| | | CTFA | parts by weight | 20 | 20 | 20 |

TABLE 6-continued

| | | | | | | |
|---|---|---|---|---|---|---|
| | | 4-hydroxybutyl acrylate | parts by weight | — | — | — |
| | | Acrylic acid | parts by weight | — | — | — |
| | Photopolymerization initiator | Irg. 184 | parts by weight | 0.1 | 0.1 | 0.2 |
| | Ultraviolet absorber | Tinuvin326 | parts by weight | — | — | — |
| | | Tinuvin400 | parts by weight | — | — | — |
| | | Tinuvin460 | parts by weight | — | — | 0.02 |
| | | PR-25 | parts by weight | — | — | — |
| | | Benzophenone | parts by weight | 0.1 | 0.005 | — |
| | Plasticizer | 3GO | parts by weight | — | — | — |
| | Styrenic compound | SX-100 | parts by weight | — | — | — |
| | Polymerization inhibitor | Hydroquinone | parts by weight | — | — | — |
| Thickness of polymerizable composition layer | | | | 3 mm | 3 mm | 3 mm |
| Active energy ray | | Type of lamp | — | Chemical lamp | Chemical lamp | Chemical lamp |
| | | Irradiation energy | mJ/cm$^2$ | 2000 | 2000 | 2000 |
| | | Maximum wavelength $\lambda_{UV}$ | nm | 350 | 350 | 350 |
| Wavelength evaluation | Photopolymerization initiator | Maximum absorption wavelength $\lambda_1$ in wavelengths of 300 nm or more | nm | 326 | 326 | 326 |
| | Ultraviolet absorber | Maximum absorbance A in wavelengths of 280 nm or more | — | 45.099 | 45.099 | 36.357 |
| | | Wavelength at which absorbance is maximum | nm | 280 | 280 | 340 |
| | | Wavelength $\lambda_2$ satisfying A/4 and being larger than $\lambda_1$ | nm | — | — | 371 |
| | $\lambda_{UV} - \lambda_1$ | | nm | 24 | 24 | 24 |
| | $\lambda_2 - \lambda_1$ | | nm | — | — | 45 |

| | | | | Comparative Example 7 | Comparative Example 8 | Comparative Example 9 |
|---|---|---|---|---|---|---|
| Components of polymerizable composition | (Meth)acrylic monomer | MEDOL10 | parts by weight | 15 | — | 5 |
| | | IBOA | parts by weight | 70 | 70 | 60 |
| | | CTFA | parts by weight | 0 | 20 | 20 |
| | | 4-hydroxybutyl acrylate | parts by weight | 15 | 5 | — |
| | | Acrylic acid | parts by weight | — | 5 | 15 |
| | Photopolymerization initiator | Irg. 184 | parts by weight | 0.2 | 0.2 | 0.2 |
| | Ultraviolet absorber | Tinuvin326 | parts by weight | — | — | — |
| | | Tinuvin400 | parts by weight | — | 0.15 | — |
| | | Tinuvin460 | parts by weight | — | — | — |
| | | PR-25 | parts by weight | — | — | — |
| | | Benzophenone | parts by weight | — | — | — |
| | Plasticizer | 3GO | parts by weight | 30 | — | 50 |
| | Styrenic compound | SX-100 | parts by weight | — | — | 30 |
| | Polymerization inhibitor | Hydroquinone | parts by weight | — | — | — |
| Thickness of polymerizable composition layer | | | | 3 mm | 3 mm | 3 mm |
| Active energy ray | | Type of lamp | — | Chemical lamp | Chemical lamp | Chemical lamp |
| | | Irradiation energy | mJ/cm$^2$ | 2000 | 2000 | 2000 |
| | | Maximum wavelength $\lambda_{UV}$ | nm | 350 | 350 | 350 |
| Wavelength evaluation | Photopolymerization initiator | Maximum absorption wavelength $\lambda_1$ in wavelengths of 300 nm or more | nm | 326 | 326 | 326 |
| | Ultraviolet absorber | Maximum absorbance A in wavelengths of 280 nm or more | — | — | 20.988 | — |
| | | Wavelength at which absorbance is maximum | nm | — | 348 | — |

TABLE 6-continued

|  |  |  |  |  |  |
|---|---|---|---|---|---|
|  | Wavelength $\lambda_2$ satisfying A/4 and being larger than $\lambda_1$ | nm | — | 354 | — |
| $\lambda_{JV} - \lambda_1$ |  | nm | 24 | 24 | 24 |
| $\lambda_2 - \lambda_1$ |  | nm | — | 28 | — |

TABLE 7

|  |  |  | Example 1 | Example 2 | Example 3 | Example 4 | Example 5 |
|---|---|---|---|---|---|---|---|
| Thermoplastic (meth)acrylic polymer | Weight average molecular weight | ×10⁴ | 182 | 176 | 160 | 158 | 148 |
|  | Molecular weight distribution ratio | — | 2.36 | 2.83 | 2.96 | 3.02 | 4.95 |
|  | Gel fraction | % by weight | 4.24 | 3.85 | 2.22 | 1.43 | 0.81 |
| Content of (meth)acrylic monomer | In 100% by weight of cured product | % by weight | 4.73 | 4.59 | 4.68 | 2.89 | 4.55 |
|  | In 100% by weight of first layer | % by weight | 2.96 | 2.87 | 2.93 | 1.81 | 2.84 |
| Peak temperature of tanδ of cured product layer |  | ° C. | 59.1 | 59.1 | 59.1 | 59.1 | 59.1 |
| Maximum temperature of surface of polymerizable composition layer at time of curing |  | ° C. | 35 | 43.8 | 51.6 | 76.7 | 100.6 |
| Pour stability at time of extrusion (melting viscosity) | Determination |  | Δ | Δ | Δ | Δ | ○ |
| Foaming state in laminated glass | Determination |  | ○ | ○ | ○ | ○ | ○ |
| Creases in cured product | Determination |  | ○○ | ○○ | ○○ | ○ | ○ |
| Curing performance of polymerizable composition | Determination |  | ○ | ○ | ○ | ○ | ○ |

|  |  |  | Example 6 | Example 7 | Example 8 | Example 9 |
|---|---|---|---|---|---|---|
| Thermoplastic (meth)acrylic polymer | Weight average molecular weight | ×10⁴ | 142 | 132 | 103 | 118 |
|  | Molecular weight distribution ratio | — | 4.24 | 3.87 | 4.98 | 3.41 |
|  | Gel fraction | % by weight | 0.81 | 1.11 | 0.36 | 2.66 |
| Content of (meth)acrylic monomer | In 100% by weight of cured product | % by weight | 4.44 | 3.95 | 1.87 | 2.25 |
|  | In 100% by weight of first layer | % by weight | 2.78 | 2.47 | 1.17 | 1.41 |
| Peak temperature of tanδ of cured product layer |  | ° C. | 59.1 | 59.1 | 59.1 | 59.1 |
| Maximum temperature of surface of polymerizable composition layer at time of curing |  | ° C. | 123.5 | 118.6 | 114.8 | 130.6 |
| Pour stability at time of extrusion (melting viscosity) | Determination |  | ○ | ○ | ○ | ○ |
| Foaming state in laminated glass | Determination |  | ○ | ○ | ○ | ○ |
| Creases in cured product | Determination |  | ○○ | ○○ | ○ | ○ |
| Curing performance of polymerizable composition | Determination |  | ○ | ○ | ○ | ○ |

TABLE 8

|  |  |  | Example 10 | Example 11 | Example 12 | Example 13 | Example 14 |
|---|---|---|---|---|---|---|---|
| Thermoplastic (meth)acrylic polymer | Weight average molecular weight | ×10⁴ | 102 | 97 | 103 | 115 | 116 |
|  | Molecular weight distribution ratio | — | 3.74 | 3.50 | 4.70 | 4.12 | 3.38 |
|  | Gel fraction | % by weight | 2.25 | 1.19 | 1.17 | 1.36 | 3.00 |
| Content of (meth)acrylic monomer | In 100% by weight of cured product | % by weight | 3.33 | 3.89 | 2.50 | 4.21 | 1.54 |
|  | In 100% by weight of first layer | % by weight | 2.06 | 2.43 | 1.56 | 2.63 | 0.96 |
| Peak temperature of tanδ of cured product layer |  | ° C. | 59.1 | 59.1 | 59.1 | 59.1 | 59.1 |
| Maximum temperature of surface of polymerizable composition layer at time of curing |  | ° C. | 110.7 | 107.8 | 98.9 | 109.1 | 83.6 |

TABLE 8-continued

|  |  |  |  |  |  |  |
|---|---|---|---|---|---|---|
| Pour stability at time of extrusion (melting viscosity) | Determination | ○ | ○ | ○ | ○ | ○ |
| Foaming state in laminated glass | Determination | ○ | ○ | ○ | ○ | ○ |
| Creases in cured product | Determination | ○ | ○ | ○ | ○ | ○ |
| Curing performance of polymerizable composition | Determination | ○ | ○ | ○ | ○ | ○ |

|  |  |  | Example 15 | Example 16 | Example 17 | Example 18 |
|---|---|---|---|---|---|---|
| Thermoplastic (meth)acrylic polymer | Weight average molecular weight | ×10⁴ | 165 | 106 | 112 | 96 |
|  | Molecular weight distribution ratio | — | — | 3.38 | 4.71 | 3.54 | 3.72 |
|  | Gel fraction | % by weight | 3.00 | 3.00 | 1.07 | 3.40 |
| Content of (meth)acrylic monomer | In 100% by weight of cured product | % by weight | 1.87 | 2.21 | 1.87 | 2.05 |
|  | In 100% by weight of first layer | % by weight | 1.17 | 1.38 | 1.17 | 1.28 |
| Peak temperature of tanδ of cured product layer |  | ° C. | 56.6 | 51.8 | 59.1 | 59.1 |
| Maximum temperature of surface of polymerizable composition layer at time of curing |  | ° C. | 94.1 | 120.3 | 132.4 | 123.8 |
| Pour stability at time of extrusion (melting viscosity) | Determination | Δ | ○ | ○ | ○ |
| Foaming state in laminated glass | Determination | ○ | ○ | ○ | ○ |
| Creases in cured product | Determination | ○ | ○ | Δ | ○ |
| Curing performance of polymerizable composition | Determination | ○ | ○ | ○ | ○ |

TABLE 9

|  |  |  | Example 19 | Example 20 | Example 21 | Example 22 | Example 23 |
|---|---|---|---|---|---|---|---|
| Thermoplastic (meth)acrylic polymer | Weight average molecular weight | ×10⁴ | 126 | 135 | 116 | 107 | 147 |
|  | Molecular weight distribution ratio | — | 3.53 | 3.66 | 3.38 | 3.85 | 2.85 |
|  | Gel fraction | % by weight | 3.50 | 4.20 | 3.00 | 2.54 | 2.39 |
| Content of (meth)acrylic monomer | In 100% by weight of cured product | % by weight | 1.05 | 1.59 | 2.52 | 1.10 | 0.89 |
|  | In 100% by weight of first layer | % by weight | 0.66 | 0.99 | 1.58 | 0.69 | 0.56 |
| Peak temperature of tanδ of cured product layer |  | ° C. | 59.1 | 59.1 | 59.1 | 59.1 | 59.1 |
| Maximum temperature of surface of polymerizable composition layer at time of curing |  | ° C. | 84.2 | 85.1 | 83.6 | 52.4 | 34.8 |
| Pour stability at time of extrusion (melting viscosity) | Determination | ○ | ○ | ○ | ○ | ○ |
| Foaming state in laminated glass | Determination | ○ | ○ | ○ | ○ | ○ |
| Creases in cured product | Determination | ○ | ○ | ○ | ○ | ○ |
| Curing performance of polymerizable composition | Determination | ○ | ○ | ○ | ○ | ○ |

|  |  |  | Example 24 | Example 25 | Example 26 | Example 27 |
|---|---|---|---|---|---|---|
| Thermoplastic (meth)acrylic polymer | Weight average molecular weight | ×10⁴ | 96 | 96 | 83 | 67 |
|  | Molecular weight distribution ratio | — | 2.25 | 4.90 | 4.81 | 3.13 |
|  | Gel fraction | % by weight | 4.84 | 0.19 | 0.02 | 0.01 |
| Content of (meth)acrylic monomer | In 100% by weight of cured product | % by weight | 0.74 | 3.97 | 3.55 | 3.96 |
|  | In 100% by weight of first layer | % by weight | 0.46 | 2.48 | 2.22 | 2.48 |
| Peak temperature of tanδ of cured product layer |  | ° C. | 59.1 | 28.4 | 41.5 | 55.4 |
| Maximum temperature of surface of polymerizable composition layer at time of curing |  | ° C. | 23.8 | 103.4 | 123.1 | 106.2 |
| Pour stability at time of extrusion (melting viscosity) | Determination | ○ | ⊚ | ⊚ | ⊚ |
| Foaming state in laminated glass | Determination | ○ | ○ | ○ | Δ |
| Creases in cured product | Determination | ○ | ○ | ⊚ | ⊚ |

TABLE 9-continued

|  |  |  |  |  |  |  |
|---|---|---|---|---|---|---|
| Curing performance of polymerizable composition | Determination | ○ | ○ | ○ | ○ |  |

TABLE 10

|  |  |  | Example 28 | Example 29 | Example 30 | Example 31 | Example 32 |
|---|---|---|---|---|---|---|---|
| Thermoplastic (meth)acrylic polymer | Weight average molecular weight | ×10⁴ | 75 | 77 | 115 | 88 | 112 |
|  | Molecular weight distribution ratio | — | 31.28 | 33.41 | 22.42 | 5.63 | 4.05 |
|  | Gel fraction | % by weight | 0.20 | 0.50 | 0.66 | 9.84 | 1.51 |
| Content of (meth)acrylic monomer | In 100% by weight of cured product | % by weight | 2.50 | 1.87 | 2.21 | 5.84 | 4.12 |
|  | In 100% by weight of first layer | % by weight | 1.56 | 1.17 | 1.38 | 3.65 | 2.58 |
| Peak temperature of tanδ of cured product layer |  | ° C. | 59.1 | 59.1 | 59.1 | 59.1 | 59.1 |
| Maximum temperature of surface of polymerizable composition layer at time of curing |  | ° C. | 152.5 | 109.3 | 154.6 | 110.8 | 87.6 |
| Pour stability at time of extrusion (melting viscosity) | Determination |  | ○○ | ○○ | Δ | ○ | ○ |
| Foaming state in laminated glass | Determination |  | ΔΔ | ΔΔ | ΔΔ | ○ | ○ |
| Creases in cured product | Determination |  | ΔΔ | ○ | ΔΔ | ○○ | ○ |
| Curing performance of polymerizable composition | Determination |  | ○ | ○ | ○ | ○ | ○ |

TABLE 11

|  |  |  | Example 33 | Example 34 | Example 35 | Example 36 | Example 37 | Example 38 |
|---|---|---|---|---|---|---|---|---|
| Thermoplastic (meth)acrylic polymer | Weight average molecular weight | ×10⁴ | 40.9 | 62.9 | 54.5 | 48.9 | 88.4 | 66.8 |
|  | Molecular weight distribution ratio | — | 9.87 | 5.27 | 8.94 | 14.05 | 3.02 | 10.25 |
|  | Gel fraction | % by weight | 0.55 | 1.79 | 0.65 | 0.80 | 21.77 | 1.40 |
| Content of (meth)acrylic monomer | In 100% by weight of cured product | % by weight | 1.70 | 1.30 | 1.90 | 1.50 | 4.10 | 2.70 |
|  | In 100% by weight of first layer | % by weight | 1.06 | 0.81 | 1.19 | 0.94 | 2.56 | 1.69 |
| Peak temperature of tanδ of cured product layer |  | ° C. | 55.9 | 57.8 | 68.5 | 45.2 | 59.0 | 59.0 |
| Maximum temperature of surface of polymerizable composition layer at time of curing |  | ° C. | 94 | 116.2 | 94.9 | 102.3 | 140.9 | 71.2 |
| Pour stability at time of extrusion (melting viscosity) | Determination |  | ○○ | ○ | ○ | ○ | Δ | ○ |
| Foaming state in laminated glass | Determination |  | ΔΔ | ○ | ○ | Δ | ○ | ○ |
| Creases in cured product | Determination |  | ○○ | Δ | ○ | ○ | Δ | Δ |
| Curing performance of polymerizable composition | Determination |  | ○ | ○ | ○ | ○ | ○ | ○ |

TABLE 12

|  |  |  | Comparative Example 1 | Comparative Example 2 | Comparative Example 3 | Comparative Example 4 | Comparative Example 5 |
|---|---|---|---|---|---|---|---|
| Thermoplastic (meth)acrylic polymer | Weight average molecular weight | ×10⁴ | 82 | 112 | 117 | 72.9 | 83.1 |
|  | Molecular weight distribution ratio | — | 21.67 | 8.27 | 8.27 | 8.50 | 8.28 |
|  | Gel fraction | % by weight | 12.50 | 9.84 | 50.25 | 11.38 | 53.50 |
| Content of (meth)acrylic monomer | In 100% by weight of cured product | % by weight | 4.89 | 7.45 | 8.88 | 9.74 | 6.98 |
|  | In 100% by weight of first layer | % by weight | 3.06 | 4.66 | 5.55 | 6.09 | 4.36 |

TABLE 12-continued

|  |  |  |  |  |  |  |
|---|---|---|---|---|---|---|
| Peak temperature of tanδ of cured product layer | ° C. | 59.1 | 59.1 | 59.1 | 59.1 | 51.2 |
| Maximum temperature of surface of polymerizable composition layer at time of curing | ° C. | 118.6 | 115.8 | 42.7 | 125.4 | 45.2 |
| Pour stability at time of extrusion (melting viscosity) | Determination | xx | x | xx | x | xx |
| Foaming state in laminated glass | Determination | ΔΔ | ○ | ○ | x | ΔΔ |
| Creases in cured product | Determination | ΔΔ | ○ | ○○ | x | ○○ |
| Curing performance of polymerizable composition | Determination | ○ | x | x | ○ | x |

|  |  |  | Comparative Example 6 | Comparative Example 7 | Comparative Example 8 | Comparative Example 9 |
|---|---|---|---|---|---|---|
| Thermoplastic (meth)acrylic polymer | Weight average molecular weight | ×10⁴ | 68.7 | 81.7 | 102.2 | 125 |
|  | Molecular weight distribution ratio | — | 16.65 | 7.03 | 36.40 | 15.87 |
|  | Gel fraction | % by weight | 21.20 | 12.20 | 15.50 | 75.60 |
| Content of (meth)acrylic monomer | In 100% by weight of cured product | % by weight | 10.87 | 2.98 | 8.33 | 3.95 |
|  | In 100% by weight of first layer | % by weight | 6.79 | 1.86 | 5.21 | 2.47 |
| Peak temperature of tanδ of cured product layer | | ° C. | 49.8 | 21.3 | 54.4 | −10.5 |
| Maximum temperature of surface of polymerizable composition layer at time of curing | | ° C. | 38.9 | 121.45 | 54.8 | 45.5 |
| Pour stability at time of extrusion (melting viscosity) | | Determination | x | x | x | xx |
| Foaming state in laminated glass | | Determination | x | ○ | x | x |
| Creases in cured product | | Determination | ○○ | Δ | x | ○ |
| Curing performance of polymerizable composition | | Determination | x | ○ | x | x |

In Examples 1 to 38, since the pour stability at the time of extrusion during production of the interlayer film is high, the obtained interlayer film was excellent in shape stability. In Comparative Examples 1 to 9, since the pour stability at the time of extrusion during production of the interlayer film is low, variation was observed in the shape of the obtained film.

EXPLANATION OF SYMBOLS

1: First layer
1a: First surface
1b: Second surface
2: Second layer
2a: Outer surface
3: Third layer
3a: Outer surface
11: Interlayer film
11A: Interlayer film (First layer)
11a: First surface
11b: Second surface
21: First lamination glass member
22: Second lamination glass member
31, 31A: Laminated glass

The invention claimed is:

1. An interlayer film for laminated glass having a one-layer or two or more-layer structure, comprising:
a first layer containing a thermoplastic (meth)acrylic polymer,
wherein the interlayer film for laminated glass satisfies at least one configuration selected from the group consisting of a Configuration (A), a Configuration (B), a Configuration (C) and a Configuration (D), as follows:

Configuration (A): the thermoplastic (meth)acrylic polymer contained in the first layer is a thermoplastic (meth)acrylic polymer having a gel fraction of 5% by weight or less;

Configuration (B): the thermoplastic (meth)acrylic polymer contained in the first layer is a thermoplastic (meth)acrylic polymer having a molecular weight distribution ratio of weight average molecular weight to number average molecular weight of 1 or more and 6 or less, and a gel fraction of 10% by weight or less;

Configuration (C): the thermoplastic (meth)acrylic polymer contained in the first layer is a thermoplastic (meth)acrylic polymer having a molecular weight distribution ratio of weight average molecular weight to number average molecular weight of 1 or more and 6 or less, and the thermoplastic (meth)acrylic polymer contained in the first layer is a polymer contained in a cured product obtained by curing a polymerizable composition containing a (meth)acrylic monomer and a photopolymerization initiator by irradiation with an active energy ray;

Configuration (D): the thermoplastic (meth)acrylic polymer contained in the first layer is a thermoplastic (meth)acrylic polymer having a gel fraction of 5% by weight or less, and the thermoplastic (meth)acrylic polymer contained in the first layer is a polymer contained in a cured product obtained by curing a polymerizable composition containing a (meth)acrylic monomer and a photopolymerization initiator by irradiation with an active energy ray.

2. The interlayer film for laminated glass according to claim 1, wherein the interlayer film for laminated glass satisfies at least one configuration selected from the group consisting of the Configuration (A) and the Configuration (D), and the thermoplastic (meth)acrylic polymer contained in the first layer is a thermoplastic (meth)acrylic polymer having a molecular weight distribution ratio of weight average molecular weight to number average molecular weight of 1 or more and 6 or less.

3. The interlayer film for laminated glass according to claim 1, wherein the interlayer film for laminated glass satisfies the Configuration (A).

4. The interlayer film for laminated glass according to claim 1, wherein the interlayer film for laminated glass satisfies the Configuration (B).

5. The interlayer film for laminated glass according to claim 1, wherein the interlayer film for laminated glass satisfies the Configuration (A), and the thermoplastic (meth)acrylic polymer contained in the first layer is a thermoplastic (meth)acrylic polymer having a molecular weight distribution ratio of weight average molecular weight to number average molecular weight of 10 or less.

6. The interlayer film for laminated glass according to claim 1, wherein the thermoplastic (meth)acrylic polymer contained in the first layer is a thermoplastic (meth)acrylic polymer having a weight average molecular weight of 500000 or more and 1900000 or less.

7. The interlayer film for laminated glass according to claim 1, wherein the thermoplastic (meth)acrylic polymer contained in the first layer is a thermoplastic (meth)acrylic polymer having a weight average molecular weight of 700000 or more and 1400000 or less.

8. The interlayer film for laminated glass according to claim 1, wherein the interlayer film for laminated glass satisfies at least one configuration selected from the group consisting of the Configuration (C) and the Configuration (D).

9. The interlayer film for laminated glass according to claim 8, wherein a content of the (meth)acrylic monomer in 100% by weight of the first layer is 3% by weight or less.

10. The interlayer film for laminated glass according to claim 8, wherein when the polymerizable composition is cured by irradiation with an active energy ray to obtain a cured product layer having a thickness of 0.8 mm, and the cured product layer is measured for dynamic viscoelasticity under conditions of a frequency of 1 Hz and a shearing mode, a peak temperature of tanδ is −10° C. or more and 100° C. or less.

11. The interlayer film for laminated glass according to claim 8, wherein the polymerizable composition contains an ultraviolet absorber.

12. The interlayer film for laminated glass according to claim 11, wherein when a maximum absorption wavelength in wavelengths of 300 nm or more of the photopolymerization initiator is defined as $\lambda_1$ nm, a maximum absorbance in wavelengths of 280 nm or more of the ultraviolet absorber is defined as A, and a wavelength that satisfies A/4 and is larger than $\lambda_1$ is defined as $\lambda_2$ nm, a combination of the photopolymerization initiator and the ultraviolet absorber is such a combination that difference between $\lambda_2$ and $\lambda_1$ is 40 nm or less.

13. The interlayer film for laminated glass according to claim 8, wherein the polymerizable composition contains a light absorber other than an ultraviolet absorber, and when a maximum absorption wavelength in wavelengths of 300 nm or more of the photopolymerization initiator is defined as $\lambda_1$ nm, a maximum absorbance in wavelengths of 280 nm or more of the light absorber other than an ultraviolet absorber is defined as B, and a wavelength that satisfies B/4 and is larger than $\lambda_1$ is defined as $\lambda_3$ nm, a combination of the photopolymerization initiator and the light absorber other than an ultraviolet absorber is such a combination that difference between $\lambda_3$ and $\lambda_1$ is 60 nm or less.

14. The interlayer film for laminated glass according to claim 8, wherein when a maximum absorption wavelength in wavelengths of 300 nm or more of the photopolymerization initiator is defined as $\lambda_1$ nm, a maximum wavelength of the active energy ray is ($\lambda_1$+20) nm or more and ($\lambda_1$+50) nm or less.

15. The interlayer film for laminated glass according to claim 8, wherein
the (meth)acrylic monomer contains a multifunctional (meth)acrylic monomer, and
a content of the multifunctional (meth)acrylic monomer in 100% by weight of the first layer is less than 0.05% by weight.

16. The interlayer film for laminated glass according to claim 8, wherein when a polymerizable composition layer obtained by applying the polymerizable composition in a thickness of 3 mm is cured by irradiation with an active energy ray of 350 mJ/cm$^2$, a maximum temperature of a surface of the polymerizable composition layer at the time of curing is 125° C. or less.

17. The interlayer film for laminated glass according to claim 8, wherein the polymerizable composition contains a polymerization inhibitor.

18. The interlayer film for laminated glass according to claim 1, wherein the first layer contains a plasticizer.

19. The interlayer film for laminated glass according to claim 1, wherein the first layer contains a tackifier.

20. The interlayer film for laminated glass according to claim 1 having a two or more-layer structure, the interlayer film further comprising:
a second layer layered on a first surface of the first layer.

21. The interlayer film for laminated glass according to claim 20, wherein the second layer contains a thermoplastic resin.

22. The interlayer film for laminated glass according to claim 21, wherein the thermoplastic resin contained in the second layer is a polyvinyl acetal resin.

23. The interlayer film for laminated glass according to claim 20 having a three or more-layer structure, the interlayer film further comprising:
a third layer layered on a second surface opposite to the first surface of the first layer.

24. The interlayer film for laminated glass according to claim 23, wherein the third layer contains a thermoplastic resin.

25. The interlayer film for laminated glass according to claim 24, wherein the thermoplastic resin contained in the third layer is a polyvinyl acetal resin.

26. A laminated glass comprising:
a first lamination glass member;
a second lamination glass member; and
the interlayer film for laminated glass according to claim 1,
the interlayer film for laminated glass being arranged between the first lamination glass member and the second lamination glass member.

* * * * *